US012731261B2

(12) United States Patent
Wang et al.

(10) Patent No.: US 12,731,261 B2
(45) Date of Patent: Sep. 8, 2026

(54) DIGITAL IMAGE SUB-DIVISION AND ANALYSIS FOR NEIGHBORING SUB-IMAGE IDENTIFICATION

(71) Applicant: Microsoft Technology Licensing, LLC, Redmond, WA (US)

(72) Inventors: Yanwei Wang, Bellevue, WA (US); Pascal Pare, Bothell, WA (US); Christopher Douglas Edmonds, Carnation, WA (US); Mark Anthony Plagge, Sammamish, WA (US); Miguel Susffalich, Kirkland, WA (US); Anuj Bharat Gosalia, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 18/473,164

(22) Filed: Sep. 22, 2023

(65) Prior Publication Data

US 2025/0104244 A1 Mar. 27, 2025

(51) Int. Cl.

*G06T 7/11* (2017.01)
*G06T 7/80* (2017.01)
*G06T 17/00* (2006.01)
*G06V 10/25* (2022.01)
*G06V 10/44* (2022.01)

(52) U.S. Cl.

CPC .................. *G06T 7/11* (2017.01); *G06T 7/80* (2017.01); *G06T 17/00* (2013.01); *G06V 10/25* (2022.01); *G06V 10/44* (2022.01); *G06V 2201/07* (2022.01)

(58) Field of Classification Search

None

See application file for complete search history.

(56) References Cited

U.S. PATENT DOCUMENTS

2017/0076438 A1 3/2017 Kottenstette et al.
2020/0098130 A1 3/2020 Porter et al.
2021/0124975 A1* 4/2021 Nilosek ................ G06V 10/757
2022/0327722 A1* 10/2022 Justus ........................ G06T 7/60
2023/0206584 A1* 6/2023 Jin ......................... G06V 20/17 382/103

OTHER PUBLICATIONS

"International Search Report and Written Opinion Issued in PCT Application No. PCT/US23/013557", Mailed Date: Jun. 9, 2023, 12 Pages.

Xiang, et al., "Mini-Unmanned Aerial Vehicle-Based Remote Sensing: Techniques, Applications, And Prospects", In Repository of arXiv:1812.07770v1, Dec. 19, 2018, pp. 1-51.

* cited by examiner

*Primary Examiner* — Frank S Chen

(74) *Attorney, Agent, or Firm* — Alleman Hall LLP

(57) ABSTRACT

Digital image processing methods performed by a computer are disclosed. In one example, a first digital image captured by a real camera is sub-divided into a first plurality of sub-images. A second digital image captured by a real camera is sub-divided into a second plurality of sub-images. A set of image features in a first sub-image of the first plurality of sub-images is identified. A subset of neighboring sub-images is identified from the second plurality of sub-images based at least on each neighboring sub-image of the subset of neighboring sub-images having one or more corresponding image features in common with the set of image features identified in the first sub-image.

20 Claims, 14 Drawing Sheets

402
400
404

Figure 17:
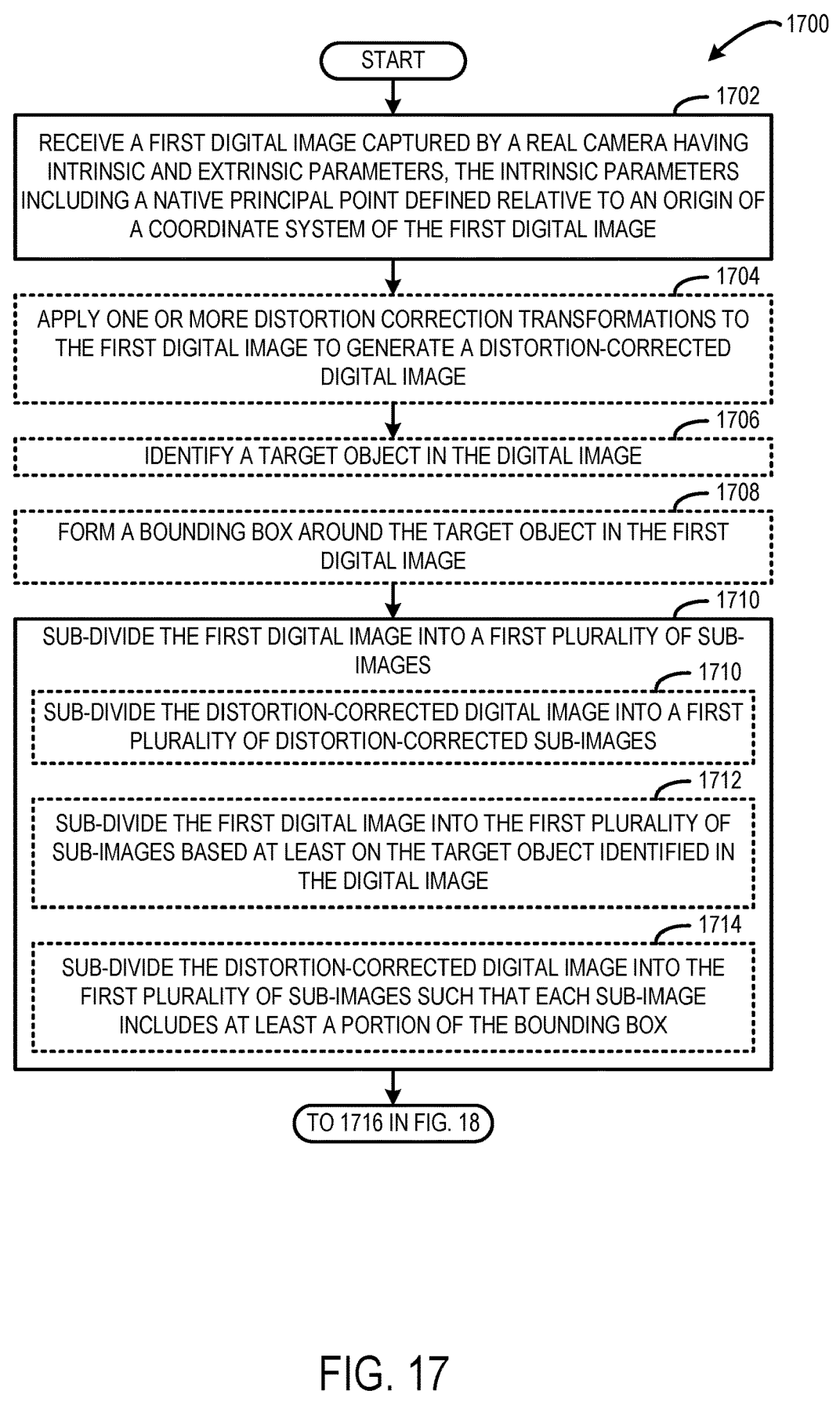

1700

START

1702
RECEIVE A FIRST DIGITAL IMAGE CAPTURED BY A REAL CAMERA HAVING INTRINSIC AND EXTRINSIC PARAMETERS, THE INTRINSIC PARAMETERS INCLUDING A NATIVE PRINCIPAL POINT DEFINED RELATIVE TO AN ORIGIN OF A COORDINATE SYSTEM OF THE FIRST DIGITAL IMAGE

1704
APPLY ONE OR MORE DISTORTION CORRECTION TRANSFORMATIONS TO THE FIRST DIGITAL IMAGE TO GENERATE A DISTORTION-CORRECTED DIGITAL IMAGE

1706
IDENTIFY A TARGET OBJECT IN THE DIGITAL IMAGE

1708
FORM A BOUNDING BOX AROUND THE TARGET OBJECT IN THE FIRST DIGITAL IMAGE

1710
SUB-DIVIDE THE FIRST DIGITAL IMAGE INTO A FIRST PLURALITY OF SUB-IMAGES

1710
SUB-DIVIDE THE DISTORTION-CORRECTED DIGITAL IMAGE INTO A FIRST PLURALITY OF DISTORTION-CORRECTED SUB-IMAGES

1712
SUB-DIVIDE THE FIRST DIGITAL IMAGE INTO THE FIRST PLURALITY OF SUB-IMAGES BASED AT LEAST ON THE TARGET OBJECT IDENTIFIED IN THE DIGITAL IMAGE

1714
SUB-DIVIDE THE DISTORTION-CORRECTED DIGITAL IMAGE INTO THE FIRST PLURALITY OF SUB-IMAGES SUCH THAT EACH SUB-IMAGE INCLUDES AT LEAST A PORTION OF THE BOUNDING BOX

Figure 18:
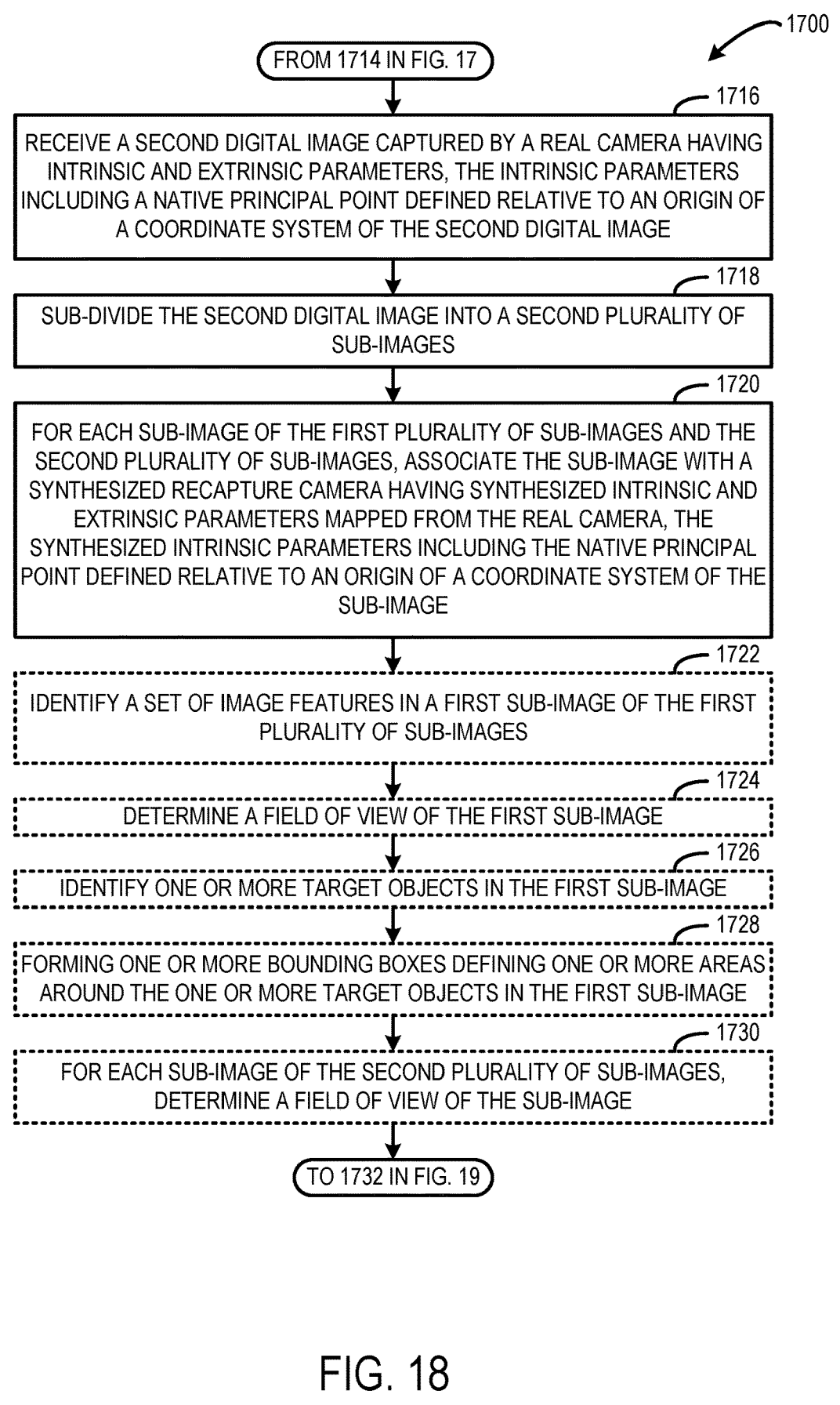

FROM 1714 IN FIG. 17

1716
RECEIVE A SECOND DIGITAL IMAGE CAPTURED BY A REAL CAMERA HAVING INTRINSIC AND EXTRINSIC PARAMETERS, THE INTRINSIC PARAMETERS INCLUDING A NATIVE PRINCIPAL POINT DEFINED RELATIVE TO AN ORIGIN OF A COORDINATE SYSTEM OF THE SECOND DIGITAL IMAGE

1718
SUB-DIVIDE THE SECOND DIGITAL IMAGE INTO A SECOND PLURALITY OF SUB-IMAGES

1720
FOR EACH SUB-IMAGE OF THE FIRST PLURALITY OF SUB-IMAGES AND THE SECOND PLURALITY OF SUB-IMAGES, ASSOCIATE THE SUB-IMAGE WITH A SYNTHESIZED RECAPTURE CAMERA HAVING SYNTHESIZED INTRINSIC AND EXTRINSIC PARAMETERS MAPPED FROM THE REAL CAMERA, THE SYNTHESIZED INTRINSIC PARAMETERS INCLUDING THE NATIVE PRINCIPAL POINT DEFINED RELATIVE TO AN ORIGIN OF A COORDINATE SYSTEM OF THE SUB-IMAGE

1722
IDENTIFY A SET OF IMAGE FEATURES IN A FIRST SUB-IMAGE OF THE FIRST PLURALITY OF SUB-IMAGES

1724
DETERMINE A FIELD OF VIEW OF THE FIRST SUB-IMAGE

1726
IDENTIFY ONE OR MORE TARGET OBJECTS IN THE FIRST SUB-IMAGE

1728
FORMING ONE OR MORE BOUNDING BOXES DEFINING ONE OR MORE AREAS AROUND THE ONE OR MORE TARGET OBJECTS IN THE FIRST SUB-IMAGE

1730
FOR EACH SUB-IMAGE OF THE SECOND PLURALITY OF SUB-IMAGES, DETERMINE A FIELD OF VIEW OF THE SUB-IMAGE

DIGITAL IMAGE SUB-DIVISION AND ANALYSIS FOR NEIGHBORING SUB-IMAGE IDENTIFICATION

BACKGROUND

Photogrammetry processes have many applications ranging from 3D mapping and navigation to online shopping, 3D printing, computational photography, computer video games, and cultural heritage archival. In some examples, 3D modeling may be performed by computer analyzing a plurality of digital images of the same target object using a set of rules (e.g., scene rigidity) to reconstruct a plausible 3D geometry of the target object. In this 3D modeling process, a digital image's resolution affects the accuracy of the resulting 3D model. In particular, a 3D model generated from higher-resolution images has a higher re-creation accuracy than a 3D model generated from lower-resolution images.

SUMMARY

Digital image processing methods performed by a computer are disclosed. In one example, a first digital image captured by a real camera is sub-divided into a first plurality of sub-images. A second digital image captured by a real camera is sub-divided into a second plurality of sub-images. A set of image features in a first sub-image of the first plurality of sub-images is identified. A subset of neighboring sub-images is identified from the second plurality of sub-images based at least on each neighboring sub-image of the subset of neighboring sub-images having one or more corresponding image features in common with the set of image features identified in the first sub-image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 17-19 show an example digital image processing method.

DETAILED DESCRIPTION

Figure 1A:
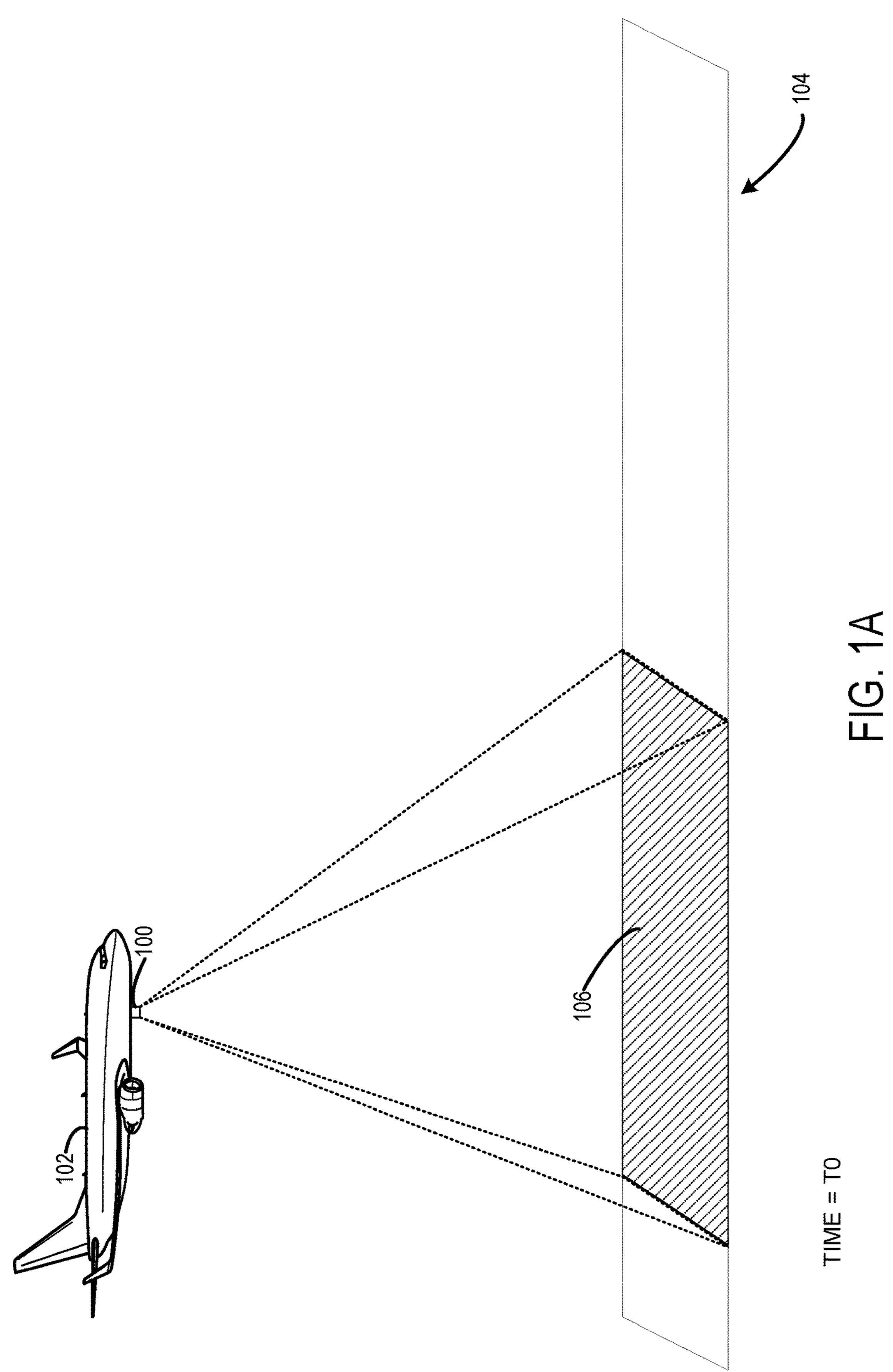
FIGS. 1A and 1B show an example scenario in which high-resolution digital images are captured by a camera mounted on an aircraft.

This disclosure is directed to approaches for sub-dividing digital images into a plurality of sub-images for various downstream processing operations. Many algorithms and/or other computer logic have been designed to process plural digital images for various purposes. The techniques described herein may be used for any workflows in which plural images are desired.

In some examples, digital images that capture the same target object from different perspectives are processed by a computer to construct a 3D model of the target object. In this 3D modeling process, a digital image's resolution affects the accuracy of the resulting 3D model. In particular, a 3D model generated from higher-resolution images has a higher re-creation accuracy than a 3D model generated from lower-resolution images. However, when the size of the digital image is very large, it is computationally expensive or even infeasible for existing computer hardware to process multiple high-resolution digital images for 3D modeling, because the digital images collectively exceed the hardware memory resources of the existing computer hardware (e.g., GPU memory size). To address this issue, digital images may be down-sampled/decimated to reduce an image size so that the down-sampled/decimated digital images can be stored in the computer's memory. One drawback of this approach is that the resulting 3D model generated from the down-sampled/decimated digital images has significantly reduced quality relative to a 3D model generated from corresponding higher-resolution images.

According to one aspect, examples are disclosed that relate to a digital image processing method in which a digital image is sub-divided into a plurality of sub-images that may be processed downstream (e.g., to generate a 3D model of a target object) in a manner that reduces consumption of computer resources relative to processing the native digital image. In particular, each sub-image has a smaller image size than the native digital image while maintaining the same native spatial resolution of the native digital image such that there is no loss in a level of detail in the sub-images relative to the native digital image. As used herein, a native digital image refers to a digital image having any suitable resolution and any suitable format. Native digital images may be preprocessed in any suitable way prior to being sub-divided (e.g., downsampled, upsampled, format converted, filtered, etc.).

Furthermore, each sub-image is associated with a distinct synthesized recapture camera having distinct synthesized intrinsic and extrinsic parameters mapped from a real camera associated with the native digital image. In particular, the synthesized intrinsic parameters for a sub-image include a native principal point of the native digital image that is re-defined relative to an origin of a coordinate system of the sub-image. Re-defining the native principal point relative to the origin of the coordinate system of the sub-image spatially registers a position of the sub-image relative to the native digital image that allows for the intrinsic and extrinsic parameters of the native digital image to be accurately synthesized for the sub-image with minimal or no distortion/orientation error.

By associating each sub-image with a distinct synthesized recapture camera having distinct synthesized intrinsic and extrinsic parameters, the digital image processing method generates each sub-image and associated synthesized recapture camera pair in a format that is suitable to be consumed as input by any processing algorithms and/or other logic designed to process plural digital images (e.g., not sub-divided). In other words, each sub-image is treated as a separate, full frame, digital image as if captured by a real camera in its entirety. In the example implementation of 3D reconstruction, because each sub-image can be analyzed/processed separately, sub-images that at least partially contain a target object can be identified and distinguished from other sub-images that do not contain the target object. The relevant sub-images that at least partially contain the target object can be input to the 3D model generator logic and the non-relevant sub-images need not be processed by the 3D model generator logic in order to generate a 3D model of the target object. In this way, the digital image processing method provides the technical benefit of increasing computer processing performance, because the intelligently selected sub-images can be collectively analyzed/processed faster relative to analyzing the corresponding native digital image from which the sub-images were sub-divided.

According to another aspect, examples are disclosed that relate to a digital image processing method in which one or more distortion correction transformations are applied to a native digital image prior to being sub-divided to account for various distortions in the native digital image (e.g., distortions from a lens of a real camera that captured the native digital image). The distortion-corrected digital image is sub-divided into a plurality of distortion-corrected sub-images, such that the same distortion correction(s) are carried through to the distortion-corrected sub-images when they are generated.

The distortion-corrected sub-images provide accurate representations of an imaged scene/a target object to be 3D modeled than sub-images that are not distortion corrected. Further, the digital image processing method provides the technical benefit of increasing computer processing performance because the digital image processing method produces distortion-corrected sub-images faster and more efficiently than an approach where each sub-image is distortion corrected individually subsequent to the native digital image being sub-divided.

According to another aspect, examples are disclosed that relate to a digital image processing method in which different digital images are sub-divided into different sets of sub-images and analysis is performed on different sub-images to realize spatial relationships between different sub-images generated from the different native digital images and find commonalities or shared traits between different sub-images generated from the different native digital images. More particularly, the digital imaging processing method identifies, for a given sub-image from a first native digital image, a subset of neighboring sub-images generated from a second native digital image based at least on those neighboring sub-images having various commonalities or shared traits with the given sub-image. In one example, neighboring sub-images may be identified as having one or more corresponding image features in common with a set of image features identified in the given sub-image. In another example, neighboring sub-images may be identified as having an area of a field of view that overlaps with a field of view of the given sub-image by greater than a threshold area. In yet another example, neighboring sub-images may be identified as including one or more target objects that are also identified as being included in the given sub-image. In some examples, these approaches may be combined to identify neighboring sub-images having the above-described commonalities or shared traits with the given sub-image.

In the example implementation of 3D reconstruction, the subset of neighboring sub-images may be identified and distinguished from other sub-images that do not contain commonalities or shared traits with the given sub-image. These relevant neighboring sub-images can be selected as input to the 3D model generator logic and the non-relevant sub-images need not be processed by the 3D model generator logic in order to generate a 3D model. In this way, the digital image processing method provides the technical benefit of increasing computer processing performance, because the intelligently selected neighboring sub-images can be collectively analyzed/processed faster relative to indiscriminately processing all sub-images generated from a native digital image. Additionally, the digital image processing method provides the technical benefit of increasing computer processing performance, because the intelligently selected neighboring sub-images can provide a more accurate representation of a target object being modeled by the 3D model generator logic than a collection of native digital images (or sub-images) that are not necessarily relevant.

Figure 1B:
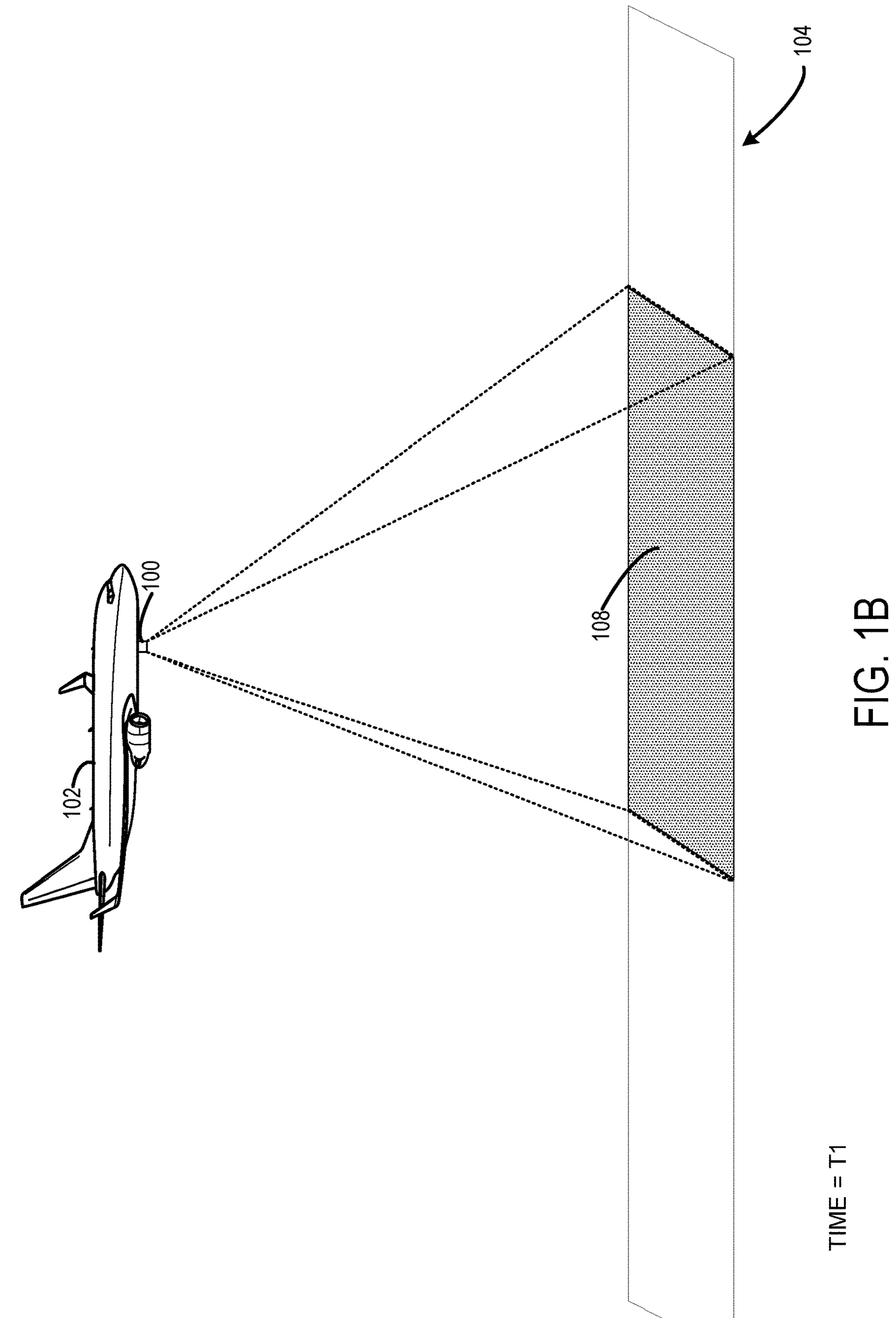

FIGS. 1A and 1B show an example scenario in which high-resolution digital images are captured by a camera 100 mounted on an aircraft 102. The aircraft 102 flies over a region 104 capturing digital images via the camera 100 from different perspectives. In one example, the camera 100 is configured to capture high-resolution digital images having a spatial resolution up to 1-5 cm per pixel. In other examples, the camera 100 may be configured to capture aerial digital images having a different spatial resolution. The camera 100 may be configured to capture digital images having any suitable spatial resolution.

In some examples, the camera 100 may be configured to capture oblique aerial imagery in which the camera's orientation is tilted relative to a target object being imaged. Such oblique aerial imagery is useful for revealing topographic details for 3D modeling of geological or archeological features, reconnaissance surveys, building, and/or other structures. In other examples, the camera 100 may be oriented substantially vertically relative to a target object being imaged.

In FIG. 1A, the camera 100 captures a first high-resolution aerial digital image 106 of the region 104 from a first perspective at time T=0. In FIG. 1B, the aircraft continues to fly of the region 104 and captures a second high-resolution aerial digital image 108 of the region 104 from a second perspective at time T=1.

The camera 100 is configured to associate intrinsic and extrinsic parameters of the camera 100 with each captured high-resolution aerial digital image. A high-resolution aerial digital image and associated camera parameters (e.g., intrinsic and extrinsic parameters) are treated as a pair that can be input to any suitable algorithms and/or other computer logic that is designed to process plural digital images for various purposes. In some examples, high-resolution aerial digital images and associated camera parameters are input to 3D model generator logic. The 3D model generator logic is configured to analyze different digital images and associated camera parameter pairs to yield a 3D model of the region 104 or one or more target objects in the region 104.

The scenario illustrated in FIGS. 1A and 1B is provided as a non-limiting example in which high-resolution digital images are captured for digital image processing using any of a variety of different algorithms and/or other computer logic (e.g., 3D modeling). As discussed above, storing and processing high-resolution digital images may consume substantial computing resources. Accordingly, a digital image processing method may be performed by a computer to sub-divide one or more digital images into one or more pluralities of sub-images in a manner that reduces consumption of computer resources relative to processing the native digital image. Further, the digital image processing method may include performing various distortion correction operations on one or more digital images prior to sub-division in order to efficiently correct for distortion in all of the generated sub-images. Further still, the image processing method may include analyzing different sub-images generated from different digital images in order to define spatial relationships between different sub-images and find commonalities or shared traits between different sub-images. For example, such analysis allows for a subset of neighboring sub-images that include content that is common or relevant to another given sub-image to be identified and distinguished from other sub-images that do not share commonalities/share traits or are otherwise not relevant. The subset of neighboring sub-images can be used as input to a 3D model generator logic to produce a more accurate 3D model in a more efficient manner than indiscriminately processing all sub-images generated from native digital images.

Although the greatest benefits of this digital image processing method are realized for high-resolution digital images, this digital image processing method is broadly applicable to any suitable type of digital images having any suitable spatial resolution captured by virtually any type of digital camera. Such a camera may be placed in a fixed position or may be moved to different positions. Although the camera 100 shown in FIG. 1 is mounted to the aircraft 102, the concepts described herein are fully compatible with virtually any stationary or moving digital camera. Moreover, such concepts are compatible with a configuration in which a plurality of different cameras capture images of a scene from different perspectives that are known relative to the other cameras.

Figure 2:
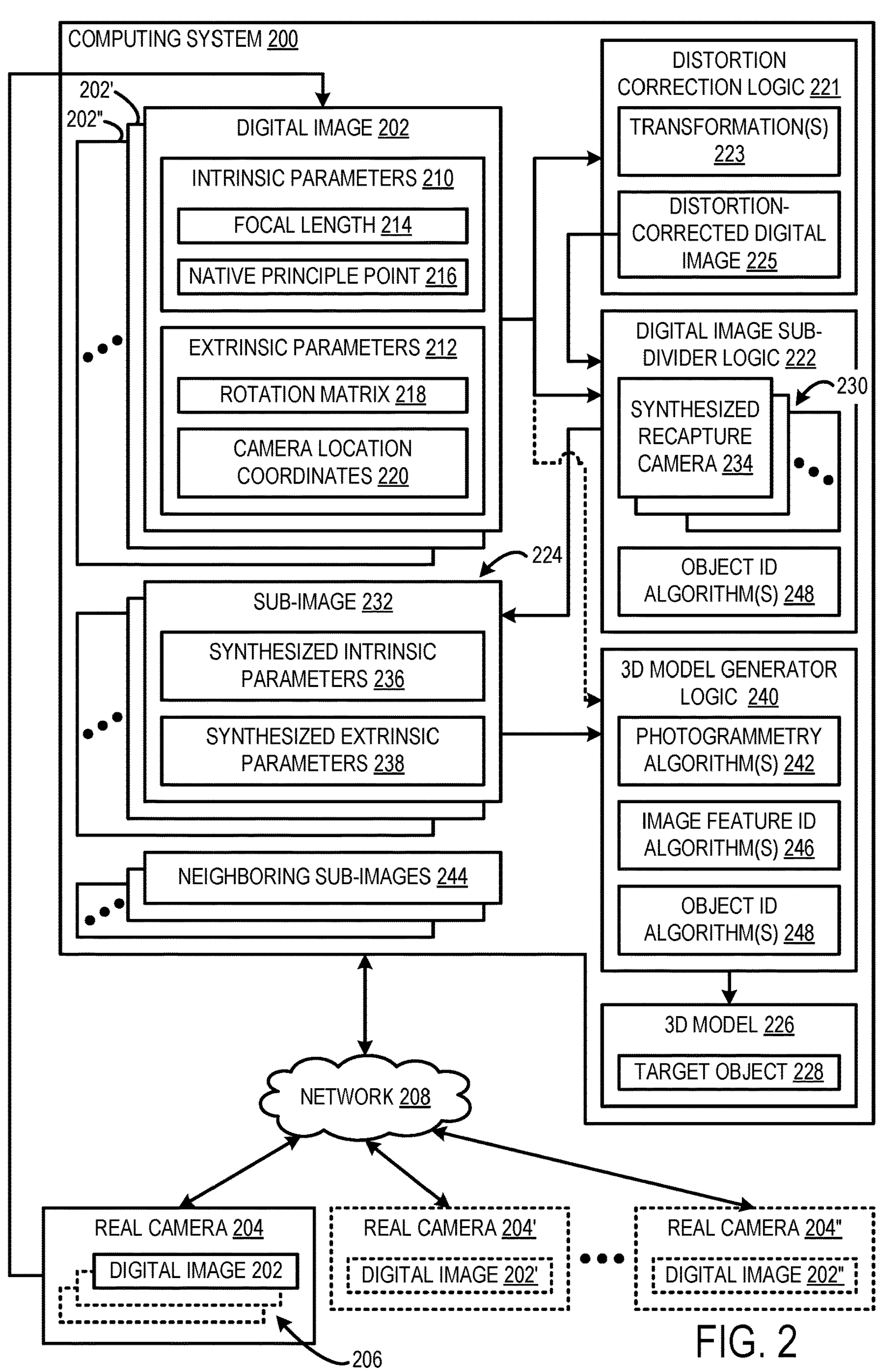
FIG. 2 shows an example computing system configured to perform digital image sub-division and analysis of spatial relationships between sub-images generated from different digital images.

FIG. 2 shows an example computing system 200 configured to perform a digital image processing method to sub-divide a digital image into a plurality of sub-images. The computing system 200 is configured to receive one or more digital images captured by one or more real cameras. For example, a representative digital image 202 captured by a representative real camera 204 is received by the computing system 200. The digital image 202 captured by the real camera 204 may be referred to herein as a native digital image.

In some examples, the computing system 200 may receive a plurality of digital images 206 from the same real camera 204. For example, the real camera 204 may be moved to different positions to capture the plurality of digital images 206 of a target object from different perspectives. This scenario is shown in FIG. 1 in which the camera 100 is affixed to the aircraft 102 and captures digital images of the region 104 as the aircraft 102 flies above the region 104.

In other examples, the computing system 200 may receive a plurality of digital images 202, 202', 202" from a plurality of different real cameras 204, 204', 204". In some such examples, the plurality of real cameras 204, 204', 204" may have different fixed positions relative to a target object. In other such examples, one or more real cameras of the plurality of real cameras 204, 204', 204" may move to different positions relative to a target object.

In still other examples, a single real camera 204 may capture the plurality of digital images 202, 202', 202" of a scene/target object from the same position over a period of time (e.g., seconds, minutes, hours, days, months, years).

In the illustrated example, the plurality of real cameras 204, 204', 204" are communicatively coupled to the computing system 200 via a computer network 208. However, the computing system 200 may be configured to receive digital images from a real camera via any suitable connection.

The computing system 200 may be configured to receive any suitable type of digital image. In various examples, the digital image 202 may include a color image, monochrome image, infrared image, depth image, and/or multi-/hyper-spectral image.

The digital image 202 is associated with intrinsic parameters 210 and extrinsic parameters 212 of the real camera 204 that captured the digital image 202. The intrinsic parameters 210 characterize the optical, geometric, and digital characteristics of the real camera 204. The intrinsic parameters 210 link pixel coordinates of an image point with the corresponding coordinates in a real camera reference frame. In one example, the intrinsic parameters 210 include a focal length 214 of the real camera 204 and a native principal point 216 of the real camera 204.

The focal length 214 indicates a distance between an optical center of a lens of the real camera 204 and an image sensor of the real camera 204. In one example, the focal length 214 is indicated as a floating-point number representing millimeters relative to the 3D Euclidean coordinate system.

The native principal point 216 of the real camera 204 defines a point of intersection between an optical axis of the camera's lens and a plane of an image sensor of the real camera 204. The native principal point 216 may differ on a camera-to-camera basis based at least on manufacturing tolerances of the different cameras. The native principal point 216 is defined relative to an origin of a coordinate system of the digital image 202. In one example, the native principal point 216 includes an X-axis principal point offset and a Y-axis principal point offset each defined as floating point numbers in pixel units relative to the origin of the coordinate system of the digital image 202.

Figures 3, 4:
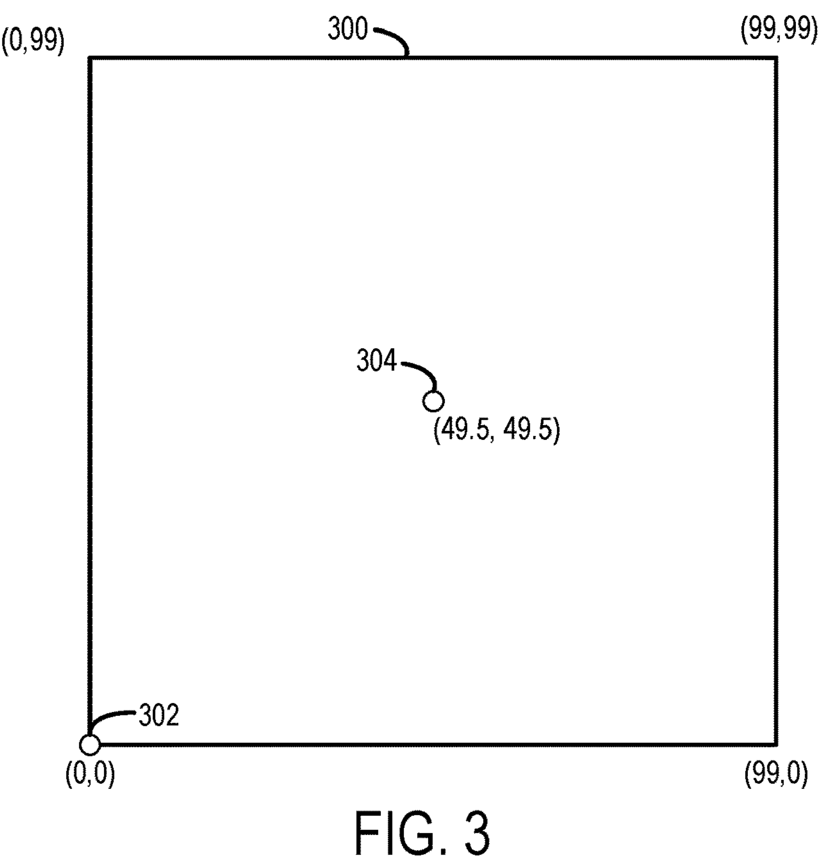
FIG. 3 shows a simplified representation of an example digital image having a native principal point defined relative to an origin of a coordinate system of the digital image.
FIG. 4 shows the simplified representation of the digital image of FIG. 3 sub-divided into a plurality of sub-images according to a grid pattern.

FIG. 3 shows an example digital image 300 representative of the digital image 202 shown in FIG. 2. The digital image 300 has a size of 100×100 pixels selected arbitrarily for this example. In other examples, a digital image may have a much larger size (e.g., 10K×10K pixels) and/or a different shape (e.g., 16:9 aspect ratio). The digital image 300 has an origin 302 that defines a frame of reference for a coordinate system of the digital image 300. In the illustrated example, the origin 302 is set at a bottom-left corner of the digital image 300 located at (0, 0). In other examples, the origin may be set at a different position (e.g., top left). According to the coordinate system of the digital image 300, a top-left corner of the digital image 300 is located at (0, 99), a top-right corner of the digital image 300 is located at (99, 99), and a bottom-right corner of the digital image 300 is located at (99, 0). A native principal point 304 of the digital image 300 is defined relative to the origin 302 of the coordinate system of the digital image 300. In the illustrated example, the native principal point 304 is located at (49.5, 49.5) relative to the position (0,0) of the origin 302. In other examples, a native principal point may have different X and Y axis offsets based at least on the specific characteristics of the real camera that captured the digital image.

Returning to FIG. 2, the digital image 202 is associated with extrinsic parameters 212 that define a location and orientation of the real camera 204 reference frame with respect to a known world reference frame. In one example, the extrinsic parameters 212 include a rotation matrix 218 and camera location coordinates 220. The rotation matrix 218 includes a two-dimensional 3×3 matrix of floating-point numbers defined within the 3D Euclidean coordinate system. The camera location coordinates 220 include X, Y, Z coordinates represented as floating-point numbers defined relative to the 3D Euclidean coordinate system. The extrinsic parameters 212 are used to identify the transformation between the real camera reference frame and the world reference frame.

The extrinsic parameters 210 and the intrinsic parameters 212 can be associated with the corresponding digital image 202 using any suitable data structure or data format. Moreover, the extrinsic parameters 210 and the intrinsic parameters 212 may be stored and/or processed in any suitable data structure or data format including data structures/data formats that are embedded in an associated digital image and/or data structures/data formats that are external to an associated digital image.

The computing system 200 includes distortion correction logic 221 that is configured to receive the digital image 202 including the intrinsic and extrinsic parameters 210, 212. The distortion correction logic 221 is configured to apply one or more distortion correction transformations 223 to correct distortions in the digital image 202 to generate a distortion-corrected digital image 225. Any suitable type of distortion correction transformation may be applied to the digital image to improve the quality of the digital image 202 that has been affected by various types of distortions or imperfections. These distortions can result from factors such as lens aberrations, camera sensor noise, motion blur, and geometric distortions. In some examples, the distortion correction transformation(s) 223 include at least one of a barrel distortion correction transformation, a pincushion distortion correction transformation, a radial distortion correction transformation, a tangential distortion correction transformation, a de-blurring transformation, a de-hazing transformation, or another suitable distortion correction transformation. Note that applying the one or more distortion correction transformations 223 to correct distortions in the digital image 202 may alter the intrinsic parameters 210 and/or extrinsic parameters 212, which would be reflected in the intrinsic and extrinsic parameters of the distortion-corrected digital image 225. The digital image sub-divider logic 222 may be implemented using any suitable configuration of hardware/software/firmware components.

The computing system 200 includes digital image sub-divider logic 222 that is configured to sub-divide a digital image into a plurality of sub-images so that the plurality of sub-images can be used to generate a 3D model 226 of a target object 228 in a manner that is faster and reduces consumption of computer resources relative to processing native digital images. The digital image sub-divider logic 222 may be implemented using any suitable configuration of hardware/software/firmware components.

In one example, the digital image sub-divider logic 222 is configured to sub-divide the digital image 202 into a plurality of sub-images 224. If distortion correction is performed on the digital image 202 via the distortion correction logic 221 to generate the distortion-corrected digital image 225, then the distortion-corrected digital image 225 is provided as input to the digital image sub-divider logic 222 instead of the digital image 202. In this case, the digital image sub-divider logic 222 is configured to sub-divide the distortion-corrected digital image 225 into a plurality of distortion-corrected sub-images 224, such that the distortion correction is carried through from the distortion-corrected digital image 225 to the plurality of distortion-corrected sub-images 224. Such an approach produces distortion-corrected sub-images faster and more efficiently than an approach where each sub-image is distortion corrected individually subsequent to the native digital image being sub-divided. Note that any downstream processing described as being performed on any of the plurality of sub-images 224 is also performed on the plurality of distortion-corrected sub-images.

As part of the digital image sub-division process, the digital image sub-divider logic 222 is configured to generate a plurality of different synthesized recapture cameras 230 (i.e., not real cameras) and associate the plurality of different synthesized recapture cameras 230 with the plurality of sub-images 224. In the illustrated example, the digital image sub-divider logic 222 is configured to associate a representative sub-image 232 with a representative synthesized recapture camera 234. The synthesized recapture camera 234 has synthesized intrinsic parameters 236 and extrinsic parameters 238 that are mapped from the intrinsic parameters 210 and the extrinsic parameters 212 of the real camera 204 that captured the digital image 202. In particular, the synthesized intrinsic parameters 236 are mapped to the intrinsic parameters 210, such that the synthesized intrinsic parameters 236 include a same focal length as the focal length 214.

In order to accurately map the intrinsic parameters 210 and the extrinsic parameters 212 to the synthesized recapture camera 234, the digital image sub-divider logic 222 is configured to re-define the native principal point 216 associated with the digital image 202 relative to an origin of a coordinate system of the sub-image 232. Further, the synthesized extrinsic parameters 238 are mapped to the extrinsic parameters 212, such that the synthesized extrinsic parameters 238 include a same rotation matrix as the rotation matrix 218 and the same camera location coordinates as the camera location coordinates 220. The digital image sub-divider logic 222 may be configured to sub-divide other digital images received from the same real camera 204 or different real cameras 204', 204" in the same manner as the representative digital image 202.

FIG. 4 shows an example scenario in which the digital image 300 of FIG. 3 is sub-divided into a plurality of sub-images 400. For example, the plurality of sub-images 400 may correspond to the plurality of sub-images 224 shown in FIG. 2. In this example, the digital image 300 is sub-divided into one hundred sub-images according to a grid pattern. Each of the plurality of sub-images 400 maintains the native spatial resolution as the digital image 300. In other words, the sub-images 400 are not down-sampled/decimated relative to the digital image 300. Further, each of the plurality of sub-images 400 has a same size (e.g., 10×10 pixels). Note that the number and size of the sub-images 400 is arbitrary in this example. A digital image may be sub-divided into any suitable number of sub-images having any suitable size according to the method described herein.

Each of the plurality of sub-images 400 is associated with a distinct synthesized recapture camera (e.g., the synthesized recapture camera 234 shown in FIG. 2) having distinct synthesized intrinsic and extrinsic parameters based at least on the relative position of the sub-image in relation to the digital image that was sub-divided.

Figure 5:
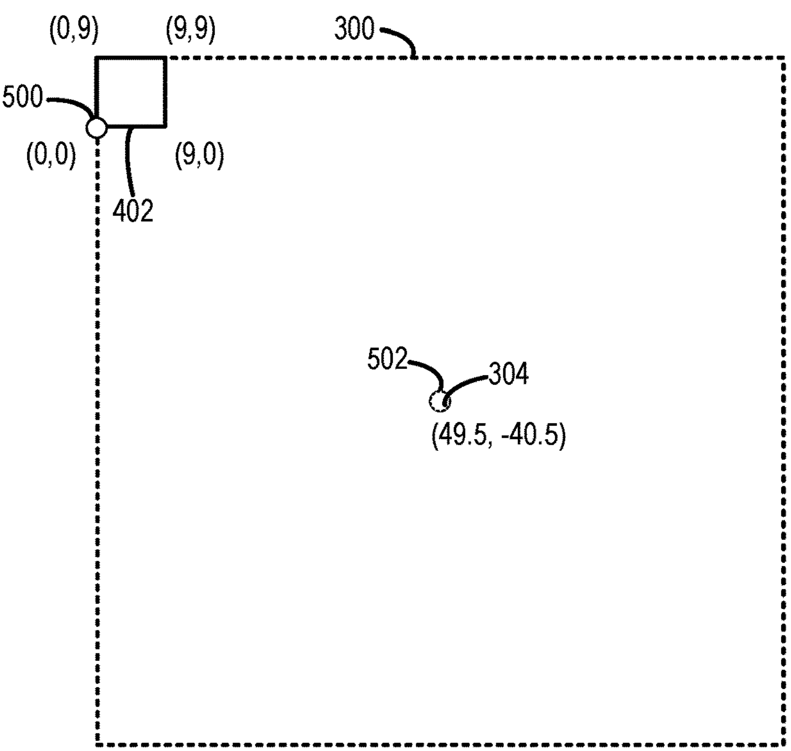
FIGS. 5 and 6 show example sub-images of the plurality of sub-images shown in FIG. 4.
Figure 6:
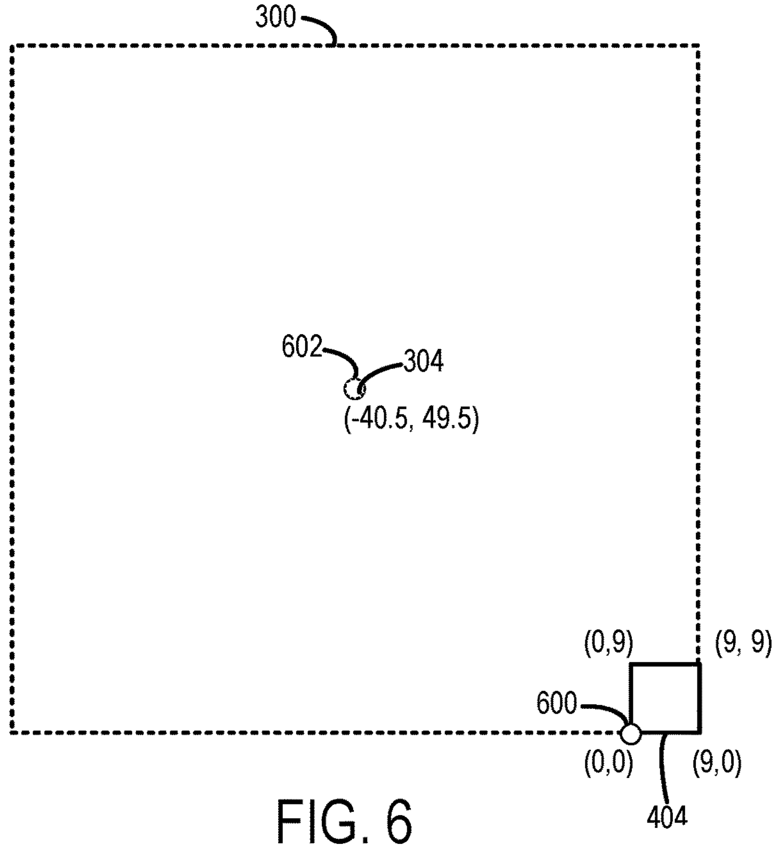

The plurality of sub-images 400 include a first sub-image 402 and a second sub-image 404. The first sub-image 402 is positioned in a top-left corner of the digital image 300. The second sub-image 404 is positioned in a bottom-right corner of the digital image 300. FIGS. 5 and 6 show how the native principal point of the digital image 300 is redefined differently for each of the first and second sub-images 402, 404 to accurately generate different synthesized recapture cameras having different synthesized intrinsic and extrinsic parameters for the first and second sub-images 402, 404.

In FIG. 5, an origin 500 of a coordinate system of the first sub-image 402 is located at (0, 0) at the bottom-left corner of the first sub-image 402. In this coordinate system of the first sub-image 402, the four corners that define the boundaries of the first sub-image 402 are the bottom-left corner located at (0, 0), the top-left corner located at (0, 9), the top-right corner located at (9, 9), and the bottom-right corner located at (9, 0). Further, the native principal point 304 of the digital image 300 is redefined relative to the origin 500 of the coordinate system of the first sub-image 402 to generate a synthesized principal point 502 of the first sub-image 402 that is outside the boundaries of the first sub-image 402. Note that the synthesized principal point 502 is at the same location as the native principal point 304 but the coordinate system is defined relative to the origin 500 of the first sub-image 402 instead of the origin of the digital image 300. In particular, the synthesized principal point 502 is located at (49.5, −40.5) relative to the origin 500 of the first sub-image 402.

In FIG. 6, an origin 600 of a coordinate system of the second sub-image 404 is located at (0, 0) at the bottom-left corner of the second sub-image 404. In this coordinate system of the second sub-image 404, the four corners that define the boundaries of the second sub-image 404 are the bottom-left corner located at (0, 0), the top-left corner located at (0, 9, the top-right corner located at (9, 9), and the bottom-right corner located at (9, 0). Further, the native principal point 304 of the digital image 300 is redefined relative to the origin 600 of the coordinate system of the second sub-image 404 to generate a synthesized principal point 602 of the second sub-image 404 that is outside the boundaries of the second sub-image 404. Note that the synthesized principal point 602 is at the same location as the native principal point 304 but the coordinate system is defined relative to the origin 600 of the second sub-image 404 instead of the origin of the digital image 300. In particular, the synthesized principal point 602 is located at (49.5, −40.5) relative to the origin 600 of the second sub-image 404.

By re-defining the native principal point of the native digital image relative to the origin of the coordinate system of the particular sub-image to generate the synthesized principal point for the sub-image, the sub-image is spatially registered to the native digital image. Such spatial registration allows for the intrinsic and extrinsic parameters of the native digital image to be accurately synthesized for the sub-image with minimal or no distortion/orientation error. Further, by associating a sub-image with a distinct synthesized recapture camera, the sub-image can be treated as a distinct digital image for various downstream processing operations in which plural images are desired. The sub-images and corresponding camera parameters may be processed by any suitable algorithms and/or other computer logic that have been designed to process plural digital images.

Returning to FIG. 2, the digital image sub-divider logic 222 may be configured to sub-divide a digital image in any suitable manner to create sub-images that are smaller than the native digital image and maintain the same native spatial resolution as the native digital image. In the example shown in FIG. 4, the digital image is sub-divided into a plurality of sub-images according to a grid pattern. In some examples, the digital image sub-divider logic 222 may be configured to sub-divide a digital image according to a different pattern. In yet other examples, the digital image sub-divider logic 222 may be configured to sub-divide a digital image based on various other factors, such as an image format of a 3D modeling algorithm. For example, the sub-division process may generate sub-images in a format that is compatible with a 3D modeling algorithm employed by the 3D model generator logic, such that the sub-images can be used as input to generate a 3D model.

Figure 7:
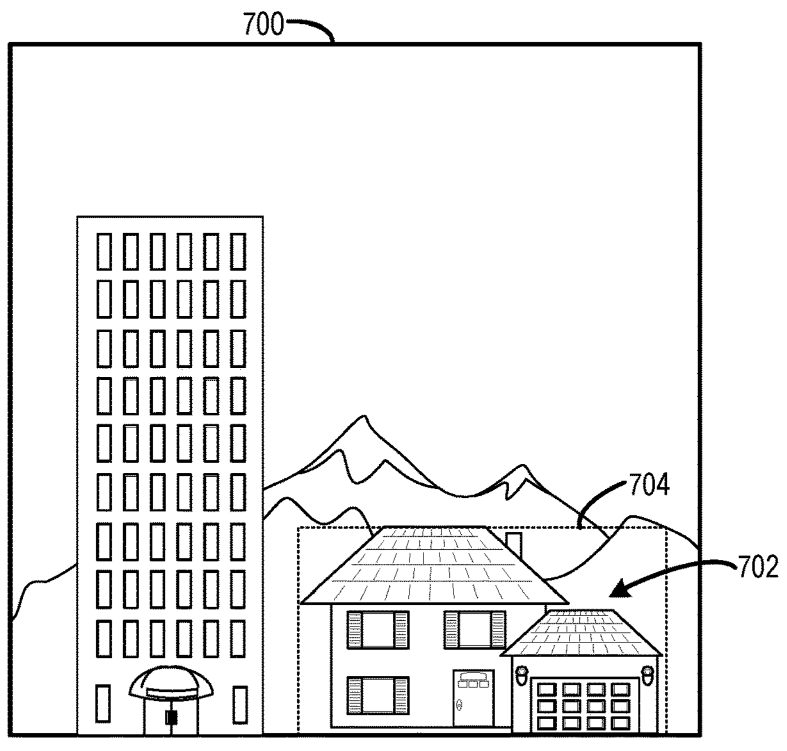
FIG. 7 shows an example digital image including a target object.
Figure 8:
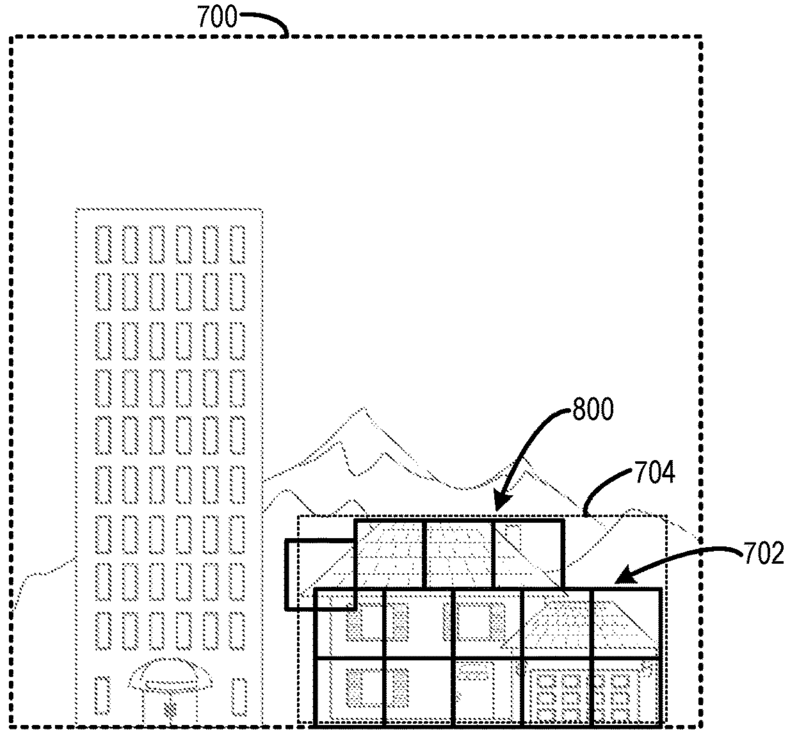
FIG. 8 shows the digital image of FIG. 7 sub-divided into a plurality of sub-images based at least on the target object in the digital image.

In some implementations, the digital image sub-divider logic 222 may be configured to sub-divide a digital image into sub-images based at least on content identified within the digital image. FIGS. 7 and 8 show an example scenario in which a digital image is sub-divided into a plurality of sub-images based at least on a target object in the digital image. FIG. 7 shows an example digital image 700 of a landscape scene including various buildings and surrounding environment. The digital image sub-divider logic 222 is configured to identify a house 702 in the digital image 700 as a target object that is specified to be 3D modeled. The digital image sub-divider logic 222 may employ any suitable object recognition or feature extraction algorithm to identify the house 702 as the target object. In one example, the digital image sub-divider logic 222 employs a machine learning model, such as a neural network for object recognition (e.g., a region-based convolutional neural network). In some examples, the machine learning model may be configured to form a bounding box 704 around the target object—e.g., the house 702 as part of the identification process. The bounding box 704 may define an area around the target object.

The digital image sub-divider logic 222 is configured to sub-divide the digital image 700 into a plurality of sub-images based on the identified target object—i.e., the house 702. FIG. 8 shows the digital image of FIG. 7 sub-divided into a plurality of sub-images 800 based at least on the house 702 identified as the target object in the digital image 700. The plurality of sub-images 800 are positioned to collectively contain the house 702. In this example, the plurality of sub-images 800 have the same arbitrarily selected size. In other examples, different sub-images may have different sizes. Note that in this example other parts of the digital image 700 that do not include the house 702 are excluded from the plurality of sub-images 800.

In examples where the bounding box 704 is formed around the house 702, the digital image sub-divider logic 222 may be configured to shape/size/position the plurality of sub-images 800 to include at least a portion of the area of the bounding box 704. In some examples, the plurality of sub-images may collectively cover the area of the bounding box. In other examples, the plurality of sub-images may collectively fit within the area of the bounding box. In still other examples, each of the plurality of sub-images may include at least a portion of the area defined by the bounding box.

In some examples, the plurality of sub-images may be sized and/or positioned such that the target object is contained within a minimum number of sub-images. Such a feature provides the technical effect of reducing a number of sub-images that are processed to generate a 3D model of the target object. In some examples, one or more of the sub-images may overlap one or more other sub-images in order to optimize the sub-image to capture the target object. In other examples, no sub-images may overlap. In some examples, the digital image sub-divider logic 222 may be configured to generate only enough sub-images to contain the target object. In other examples, the digital image sub-divider logic 222 may be configured to generate enough sub-images to contain the entire digital image. The digital image sub-divider logic 222 may be configured to sub-divide a digital image into a plurality of sub-images based on an identified target object in any suitable manner.

In some examples, the digital image sub-divider logic 222 may be configured to perform the sub-division process repeatedly on the same digital image to generate sub-images that are optimized for different target objects identified in the same digital image. In some examples, the digital image sub-divider logic 222 may be configured to perform a distinct sub-division process that optimizes sub-images for each target object that is identified in the digital image.

In some implementations, the digital image sub-divider logic 222 may be configured to perform the sub-division process differently on different digital images. In one example, the digital image sub-divider logic 222 is configured to identify one or more target objects (e.g., the target object 228) in the digital image 202 as target object(s) using one or more object identification algorithms 248. For example, the target object(s) may be identified in order to be 3D modeled by 3D model generator logic 240.

Example object identification algorithms include, but are not limited to, Haar cascade classifiers, histograms of oriented gradients (HOGs), you only look once (YOLO), and deep learning-based approaches, such as convolutional neural networks. The digital image sub-divider logic 222 may employ any suitable object recognition or feature extraction algorithm to identify the target object 228.

The digital image sub-divider logic 222 may be configured to sub-divide the digital image 202 based on the target object 228 identified using the one or more object identification algorithms 248. Further, the digital image sub-divider logic 222 may be configured to identify the same target object 228 in other digital images and sub-divide those digital images based on the target object being identified in those digital images. For example, a target object may have one position and/or perspective in one digital image and a different position and/or perspective in another digital image and the digital image sub-divider logic 222 may generate different clusters of sub-images from the different digital images to capture the target object at the different positions/perspectives.

Referring back to the example shown in FIGS. 7 and 8, the digital image sub-divider logic 222 is configured to sub-divide the digital image 700 into a plurality of sub-images 800 based at least on the house 702 being identified as the target object in the digital image 700 using the one or more object identification algorithms 248. In particular, the plurality of sub-images 800 are shaped/sized/positioned to collectively contain the house 702 identified as the target object and/or the plurality of sub-images 800 include parts of the area defined by the bounding box 704.

Figure 9:
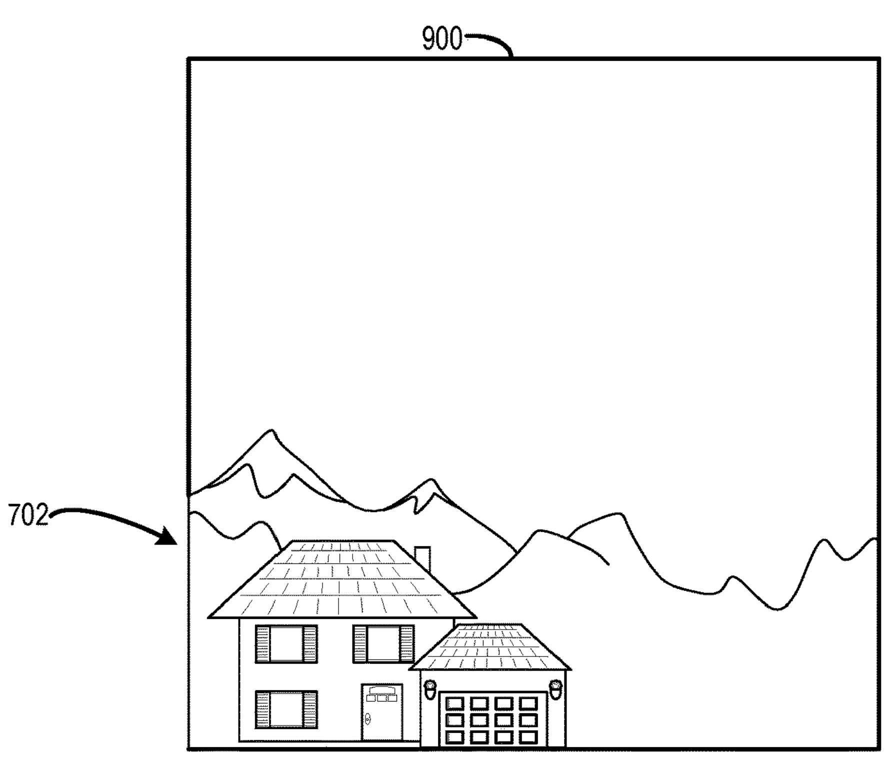
FIG. 9 shows another example digital image including the target object from a different perspective than the perspective of the digital image of FIG. 7.
Figure 10:
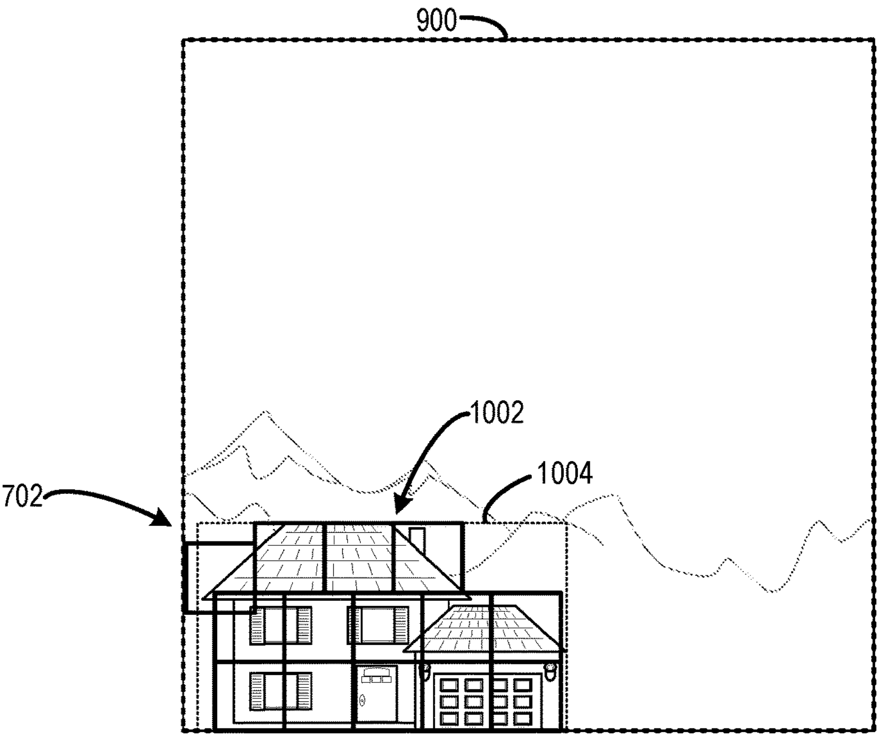
FIG. 10 shows the digital image of FIG. 9 sub-divided into a plurality of sub-images based at least on the target object in the digital image.

FIG. 9 shows another digital image 900 of the same house 702 that is in the digital image 700 shown in FIG. 7. The digital image 900 is captured from a different position/perspective. The digital image sub-divider logic 222 may be configured to identify the house 702 in the digital image 900 using the one or more object identification algorithms 248. Further, as shown in FIG. 10, the digital image sub-divider logic 222 may be configured to sub-divide the digital image 900 into a plurality of sub-images 1002 based at least on the house 702. More particularly, in the illustrated example, the plurality of sub-images 1002 are shaped/sized/positioned to collectively cover the house 702. In some examples, the digital image sub-divider logic 222 is configured to form a bounding box 1004 defining an area around the house 702 and the plurality of sub-images 1002 include at least a portion of the area defined by the bounding box 1004. Note that because the house 702 assumes different positions in the digital image 700 and the digital image 900, the digital image sub-divider logic 222 sub-divides the digital images 700, 900 differently in order to intelligently generate sub-images that include the target object—e.g., the house 702.

By sub-dividing different digital images differently in order to generate sub-images that specifically include a target object while excluding sub-images that do not include the target object from being generated, the resulting set of sub-images can be processed by the 3D model generator logic 240 to generate the 3D model faster and more efficiently than generating the 3D model based on a set of high-resolution digital images or a set of sub-images that include sub-images that are unrelated to the target object.

Figure 11:
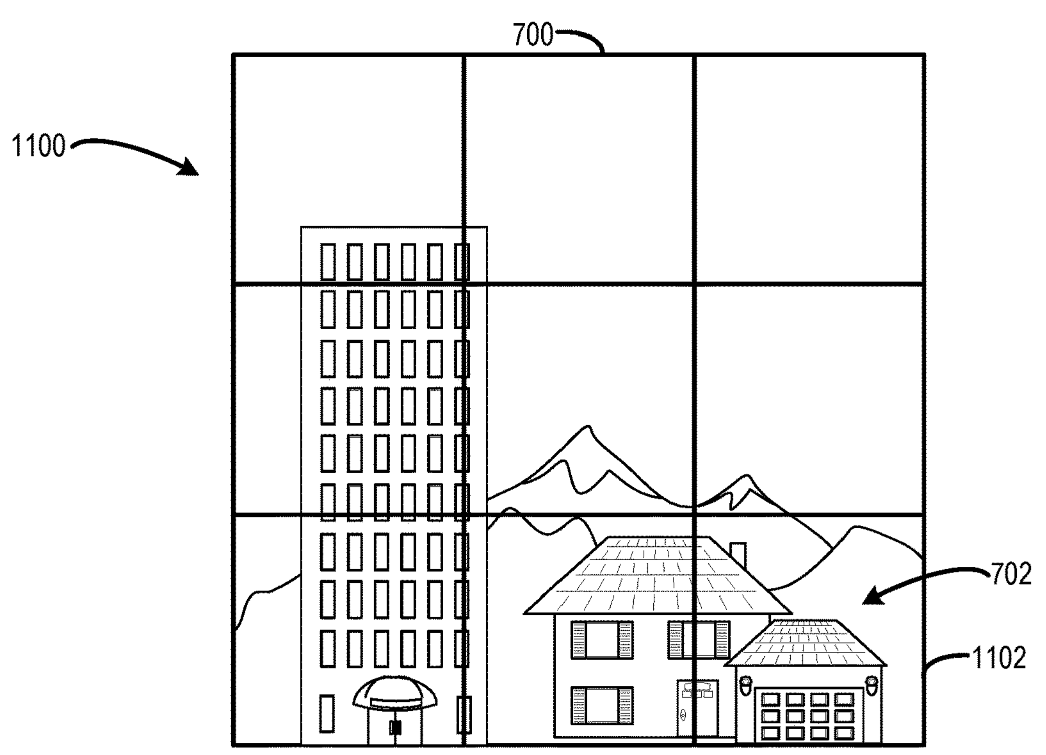
FIG. 11 shows the digital image of FIG. 7 sub-divided into a first number of sub-images.
Figure 12:
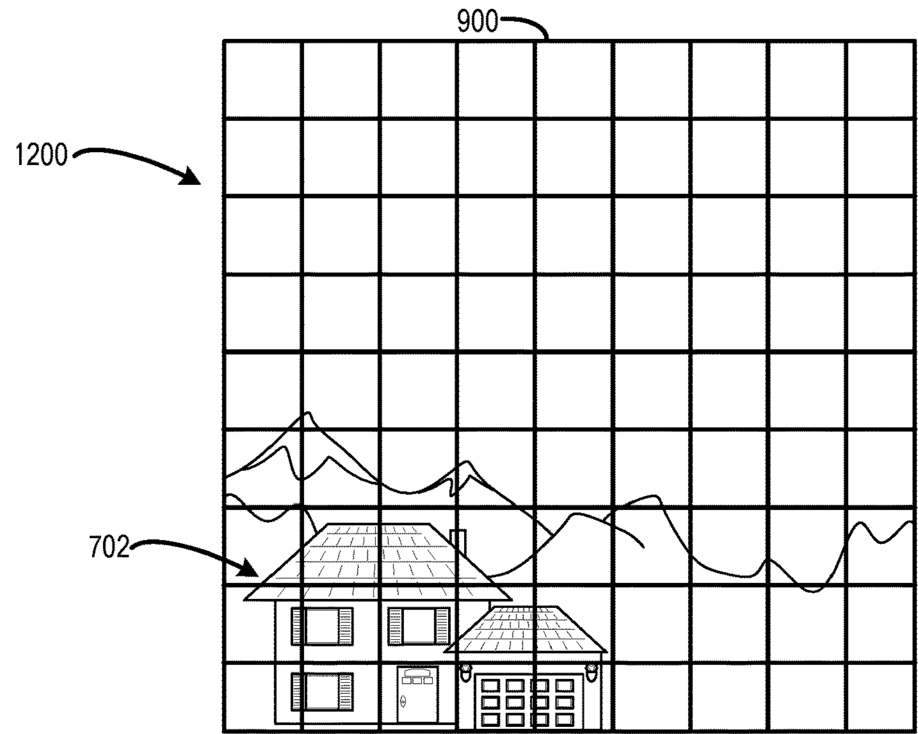
FIG. 12 shows the digital image of FIG. 9 sub-divided into a second number of sub-images greater than the first number of sub-image shown in FIG. 11.

In some implementations, the digital image sub-divider logic 222 is configured to sub-divide different digital images into different sized sub-images (and/or a different number of sub-images). FIGS. 11 and 12 show an example scenario where the digital image 700 and the digital image 900 are the same size and both digital images include a target object in the form of the house 702 captured from different perspectives. The digital image sub-divider logic 222 sub-divides the digital image 700 into a first plurality of sub-images 1100—e.g., 3×3 sub-images, in this example. For example, this size designation may be used in order to capture a target object in a particular sub-image or subset of sub-images generated from sub-dividing the digital image 700. Further, the digital image sub-divider logic 222 sub-divides the digital image 900 into a second plurality of sub-images 1200—e.g., 9×9 sub-images, in this example. This will provide an image area ratio of 1:9 between the two different types of sub-images generated from sub-dividing the digital image 700 and the digital image 900. By dividing the digital image 900 into a greater number of smaller sub-images relative to the number of sub-images generated from sub-dividing the digital image 700, the sub-images generated from sub-dividing the digital image 900 can not only cover a center part of the house 702, but also can cover edges/peripheral regions of the house 702 as well. Such an approach for sub-dividing images can increase the accuracy of a 3D model representing the target object, because all parts of the target object can be covered by the smaller sized sub-images. Moreover, such an approach for sub-dividing images can cover a target object more efficiently than using larger sub-images, because a total image area covered by the sub-images may be less than what would be covered with larger sub-images and thus creates less total image area to process when using the sub-images to generate a 3D model of the target object.

Returning to FIG. 2, the computing system 200 includes 3D model generator logic 240 that is configured generate a 3D model of an object or a scene based at least on a set of images that include the object or the scene as well as intrinsic and extrinsic camera parameters associated with the set of images. The 3D model generator logic 240 may be implemented using any suitable configuration of hardware/software/firmware components.

As discussed herein, the digital image 202, which may be a high-resolution digital image, for example, is sub-divided into a plurality of sub-images 224 by the digital image sub-divider logic 222. The plurality of sub-images may be treated as distinct digital images by the 3D model generator logic 240. In particular, the 3D model generator logic 240 may be configured to receive the plurality of sub-images 224 and the corresponding synthesized intrinsic parameters 236 and the synthesized extrinsic parameters 238 of the plurality of synthesized recapture cameras 230 as input. In one example, for each sub-image, the intrinsic and extrinsic parameters that are provided as input to the 3D model generator logic 240 include a focal length (f), a principal point X-axis offset (px), and a principal point Y-axis offset (py) as intrinsic parameters, and a 2D 3×3 extrinsic rotation matrix, a X-axis location coordinate of the camera, a Y-axis location coordinate of the camera, and a Z-axis location coordinate of the camera as extrinsic parameters. The 3D model generator logic 240 may be configured to generate the 3D model 226 of the target object 228 (or a scene in the plurality of sub-images 224) based at least on the plurality of sub-images 224 and the synthesized intrinsic and extrinsic parameters 236, 238 associated with the synthesized cameras 230 corresponding to the plurality of sub-images 224.

In some examples, the 3D model generator logic 240 may be configured to generate the 3D model 226 of the target object 228 based at least on analysis of all of the sub-images 224 that are sub-divided from the digital image 202. In other words, the 3D model generator logic 240 may indiscriminately process the plurality of sub-images 224 to generate the 3D model 226.

In some implementations, the 3D model generator logic 240 may be configured to identify the target object 228 in the digital image 202 using the one or more object identification algorithms 248. Note that in some examples the 3D model generator logic 240 may use the same object identification algorithm as the one used by the digital image sub-divider logic 222. In other examples, the 3D model generator logic 240 may use a different object identification algorithm than the one used by the digital image sub-divider logic 222. The 3D model generator logic 240 may be configured to identify a set of sub-images of the plurality of sub-images 224 that each at least partially include the target object 228 and generate the 3D model 226 of the target object 228 based at least on the set of sub-images including synthesized intrinsic and extrinsic parameters associated with the synthesized cameras corresponding to the set of sub-images.

Since each sub-image can be analyzed/processed separately, sub-images that at least partially contain the target object 228 can be distinguished from other sub-images that do not contain the target object 228. The relevant set of sub-images that at least partially contain the target object can be input to the 3D model generator logic 240 and the non-relevant sub-images need not be processed by the 3D model generator logic 240 in order to generate the 3D model 226 of the target object 228. In this way, the computing system 200 provides the technical benefit of increasing computer processing performance, because the intelligently selected set of sub-images can be collectively analyzed/processed faster relative to analyzing the corresponding native digital image 202.

In some implementations, the 3D model generator logic 240 may be configured to analyze different sub-images generated from sub-dividing different digital images in order to realize spatial relationships between those different sub-images and to find commonalities or shared traits between different sub-images that are generated from the different digital images. More particularly, the 3D model generator logic 240 may be configured to determine various image characteristics of a given sub-image, such as the sub-image 232 generated from sub-dividing the digital image 202, and analyze a plurality of sub-images generated from sub-dividing a different digital image, such as the digital image 202', and identify a subset of neighboring sub-images 244 selected from the plurality of sub-images generated from sub-dividing the digital image 202' based at least on those neighboring sub-images having image characteristic in common with the sub-image 232. By identifying neighboring sub-images generated from different digital images, those sub-images can be distinguished from other sub-images that do not share any commonalities/traits or are otherwise not as relevant given the particular type of analysis being performed to identify the neighboring sub-images. Further, the neighboring sub-images can be provided as input to generate the 3D model 226 faster, more efficiently, and more accurately than indiscriminately providing any or all sub-images that are generated from the sub-division process for 3D model generation.

The 3D model generator logic 240 may be configured to identify neighboring sub-images generated from sub-dividing a different digital image based at least on the sub-images having any suitable image characteristics or traits in common with a given sub-image.

In some implementations, the 3D model generator logic 240 is configured to select a sub-image, such as the sub-image 232, from a first plurality of sub-images 224 generated by sub-dividing the digital image 202 for analysis to find neighboring sub-images having common image features with the sub-image 232. The 3D model generator logic 240 is configured to identify a set of image features in the sub-image 232 using one or more image feature identification algorithms 246. The image features may include any suitable points, regions, or patterns within the sub-image that have unique characteristics that distinguish them from their surroundings. These characteristics can include visual properties like color, texture, shape, and intensity. Example image features include corners, edges, blobs, lines, curves, and textual patterns. The 3D model generator logic 240 may use any suitable image feature extraction algorithm(s) to identify the set of image features, such as the Harris corner detection algorithm, the Shi-Tomasi corner detection algorithm, the scale-invariant feature transform (SIFT) algorithm, the speeded-up robust features (SURF) algorithm, or another suitable image feature identification algorithm.

The 3D model generator logic 240 is configured to analyze a second plurality of sub-images generated from sub-dividing the second digital image 202' to identify a subset of neighboring sub-images 244 selected from the second plurality of sub-images based at least on each neighboring sub-image of the subset of neighboring sub-images having one or more corresponding image features in common with the set of image features identified in the sub-image 232. For example, neighboring sub-images may be selected for having at least a same corner, edge, pattern, or other image feature identified as being in the sub-image 232. Such common image feature(s) shared by the sub-image 232 and the neighboring sub-images indicate that the sub-images are spatially related and have the same image feature(s), which is useful for efficiently processing the sub-images to generate the 3D model 226 or to efficiently perform other downstream processing operations.

In some implementations, the 3D model generator logic 240 may employ a more stringent selection process for identifying neighboring sub-images by increasing the threshold of image features in common between the sub-image 232 and neighboring sub-images. For example, the image feature threshold may be set to 5, 10, 20, 50, or more image features in common between the sub-image 232 and each of the neighboring sub-images 244. The 3D model generator logic 240 may set the threshold number of image features in common to any suitable number depending on the implementation.

Note that the 3D model generator logic 240 may perform the image feature-based neighboring sub-image identification process by comparing any sub-image generated by sub-dividing a first digital image with a plurality of sub-images generated by sub-dividing a second digital image. For example, the neighbor identification process may be performed for every sub-image generated from sub-dividing the digital image 202 in order to define different subsets of sub-images that have spatial relationships/commonalities with each other.

Figure 13:
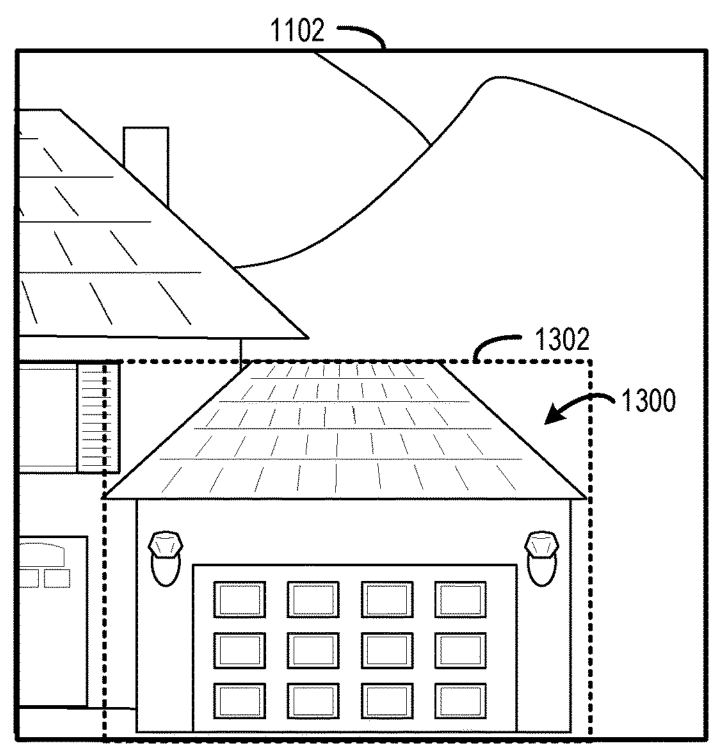
FIG. 13 shows an example sub-image of the plurality of sub-images shown in FIG. 11.
Figure 14:
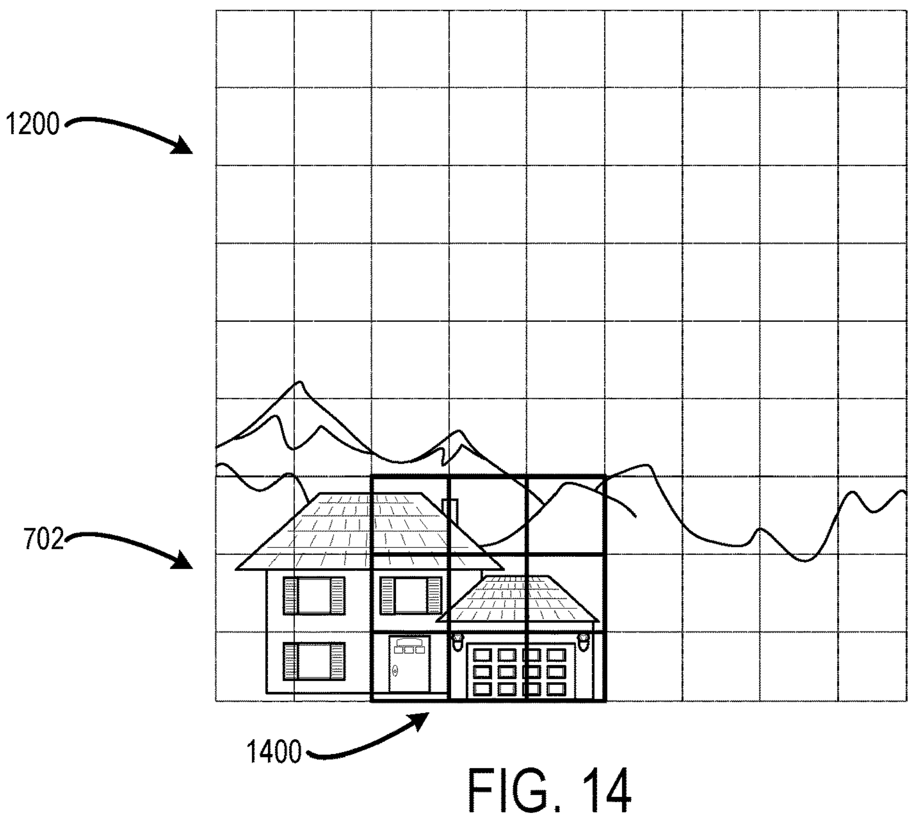
FIGS. 14-16 show different subsets of neighboring sub-images identified based on performing different neighboring sub-image identification processes.

FIGS. 13 and 14 show an example scenario in which the image feature-based neighboring sub-image identification process is performed based on a sub-image 1102. FIG. 13 shows the sub-image 1102 that is selected from the plurality of sub-images 1100 generated from sub-dividing the digital image 700 as shown in FIG. 11. The 3D model generator logic 240 identifies a set of image features (e.g., edges, corners) in the sub-image 1102 using one or more image feature identification algorithms 246. Further, the 3D model generator logic 240 applies the one or more image feature identification algorithms 246 to the plurality of sub-images 1200 generated from sub-dividing the digital image 900 as shown in FIG. 12. In particular, the 3D model generator logic 240 searches each sub-image of the plurality of sub-images 1200 for image features from the set of image features identified in the sub-image 1102. Further, as shown in FIG. 14, the 3D model generator logic 240 identifies a subset of neighboring sub-images 1400 from the plurality of sub-images 1200 based at least on each neighboring sub-image of the subset of neighboring sub-images 1400 having one or more corresponding image features in common with the set of image features identified in the sub-image 1102. For example, the 3D model generator logic 240 may use the subset of neighboring sub-images 1400 to generate a 3D model of the house 702 faster and more efficiently than using all of the sub-images of the plurality of sub-images 1200. Note that the subset of neighboring sub-images 1400 may be used for any suitable downstream image processing operations. Further, note that although the neighboring sub-images in the subset 1400 are a different size than the sub-image 1102, the image feature-based neighboring sub-image identification process can also be performed on sub-images that are the same size.

In some implementations, the 3D model generator logic 240 is configured to identify neighboring sub-images based at least on a size of an overlapping area of fields of view between sub-images. More particularly, the 3D model generator logic 240 is configured to determine a field of view of the sub-image 232 based at least on the synthesized intrinsic parameters 236 and extrinsic parameters 238 of the sub-image 232. For example, the field of view can be determined by calculating a camera projection matrix of the synthesized camera corresponding to the sub-image. The camera projection matrix combines both synthesized intrinsic and extrinsic parameters and relates 3D world coordinates (X, Y, Z) to two-dimensional (2D) image coordinates (x, y). In one example, the camera projection matrix can be represented as:

$$[x]\ [fx\ \ 0\ \ cx\ \ 0]$$
$$[y] = \ 0\ \ fy\ \ cy\ \ 0]\ \ [R\ |\ T]\ \ [X]$$
$$[1]\ [0\ \ 0\ \ 1\ \ 0]$$

Here, (fx, fy) are the focal lengths, (cx, cy) are the principal points, [R|T] is the combined extrinsic matrix, and (X, Y, Z) are the 3D world coordinates. For a rectangular image sensor, the following formula can be used to determine the field of view (FOV):

$$\text{FOV\_x} = 2 * \arctan(cx/fx)$$
$$\text{FOV\_y} = 2 * \arctan(cy/fy)$$

FOV_x and FOV_y represent the horizontal and vertical FOV, respectively. The field of view represents the angle of view covered by the synthesized camera in the horizontal, vertical, or diagonal direction, as per the calculation method used to determine the field of view. In some implementations, the field of view may be determined based at least on additional or alternative camera parameters, such as camera position (e.g., using a GPS) and orientation (e.g., using an IMU), simultaneous location and mapping, image classification, or other camera parameters.

Further, the 3D model generator logic 240 is configured to, for each sub-image of the plurality of sub-images generated from sub-dividing the digital image 202', determine a field of view of the sub-image based at least on the synthesized intrinsic parameters and extrinsic parameters of the sub-image. For example, the fields of view of the plurality of sub-images may be determined in the manner described above. The fields of view of the different sub-images can be determined and compared using the synthesized extrinsic and intrinsic parameters of each of the sub-images which are known from the processes of sub-dividing the digital images to generate the different sub-images.

The 3D model generator logic 240 is configured to identify a subset of neighboring sub-images 244 from the plurality of sub-images based at least on each neighboring sub-image of the subset of neighboring sub-images 244 having an area of a corresponding field of view that overlaps with the field of view of the sub-image 232 by greater than a threshold area. The threshold area of the field of view that is used to identify a neighboring sub-image may be set to any suitable threshold area. For example, the threshold area may be set to 5%, 10%, 25% or more of the field of view. In other examples, the threshold area may be set to a different percentage of the field of view that overlaps between the fields of view of different sub-images. In other examples, a region of interest may be identified in the field of view of the sub image 232 (e.g., a bounding box) and the 3D model generator logic 240 may identify neighboring sub-images based at least on having an area of a corresponding field of view that overlaps with the region of interest within the field of view of the sub-image 232 by greater than a threshold area.

Returning to the example scenario shown in FIGS. 13 and 14, the subset of sub-images 1400 may be identified as being neighboring sub-images of the sub-image 1102 based at least on an area threshold being set at 10% of the total field of the sub-image 1102. In particular, each of sub-images in the subset of sub-images 1400 have a field of view that overlaps with $1/9^{th}$ the field of view of the sub-image 1102, which is greater than the 10% threshold area. The other sub-images of the plurality of sub-images 1200 do not overlap have fields of view that overlap with the field of view of the sub-image 1102 by more than the 10% threshold and thus are excluded from the subset of neighboring sub-images 1400.

In some implementations, the 3D model generator logic 240 is configured to perform a target object-based neighboring sub-image identification process. The 3D model generator logic 240 is configured to identify one or more target objects (e.g., target object 228) in the sub-image 202 using the one or more object identification algorithms 248. In one example, the one or more object identification algorithms 248 may be implemented as a machine learning model. Further, the 3D model generator logic 240 is configured to search the plurality of sub-images generated from sub-dividing the digital image 202' to identify the one or more target objects in those sub-images. Based on such searching, the 3D model generator logic 240 is configured to identify a subset of neighboring sub-images 244 from the plurality of sub-images based at least on each neighboring sub-image of the subset of neighboring sub-images 244 also including the one or more target objects. In some examples, a neighboring sub-image may be identified based at least on the target object(s) being partially included in the sub-image. In other examples, a neighboring sub-image may be identified based at least on the target object(s) being wholly contained in the sub-image.

Figure 15:
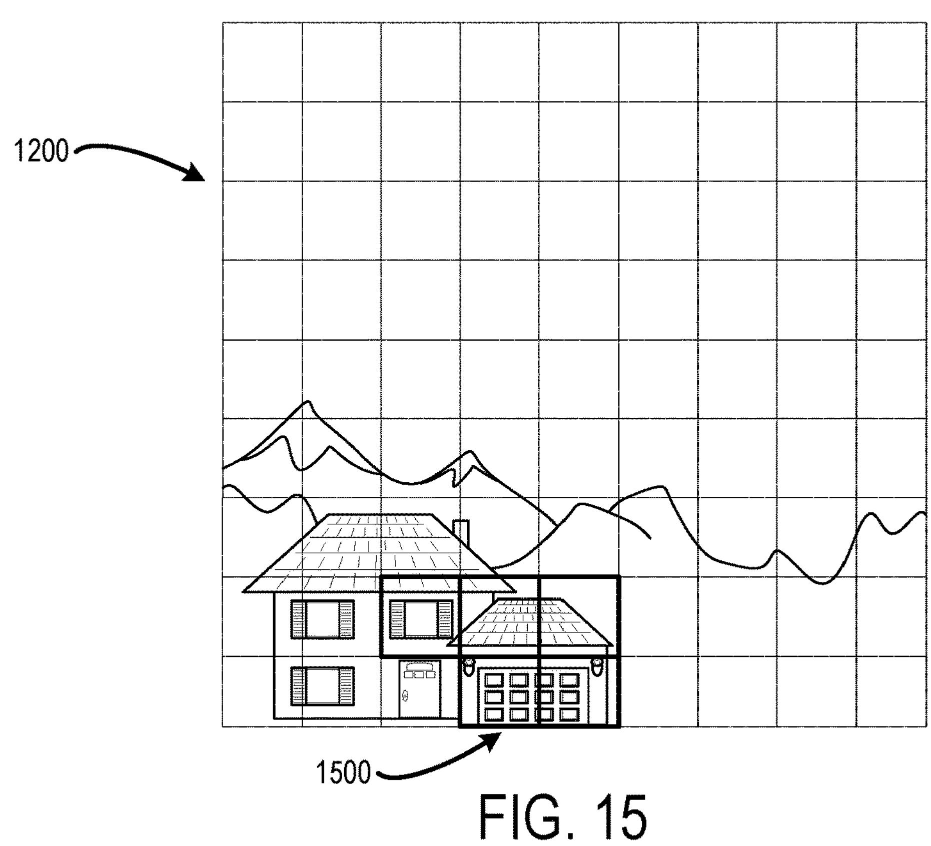

FIGS. 13 and 15 show an example scenario in which the target object-based neighboring sub-image identification process is performed based on the sub-image 1102. The sub-image 1102 is generated from sub-dividing the digital image 700 shown in FIG. 7. In FIG. 13, the 3D model generator logic 240 identifies a garage 1300 as the target object in the sub-image 1102 using the object identification algorithm 248. Further, the 3D model generator logic 240 searches the plurality of sub-images 1200 for sub-images that include the target object 1300 using object identification algorithm 248. The plurality of sub-images 1200 are generated from sub-dividing the digital image 900 shown in FIG. 9. In FIG. 15, the 3D model generator logic 240 identifies the subset of neighboring sub-images 1500 based at least on each neighboring sub-image in the subset 1500 including the target object—e.g., the garage 1300. In the illustrated example, sub-images that include a portion of the target object are determined to be neighboring sub-images.

In some implementations, the 3D model generator logic 240 is configured to form one or more bounding boxes defining one or more areas around the one or more target objects as part of the process of identifying the one or more target objects. Further, the 3D model generator logic 240 is configured to identify the neighboring sub-images in the subset of neighboring sub-images 244 based at least on the sub-images including at least a portion of the one or more areas defined by the one or more bounding boxes.

Figure 16:
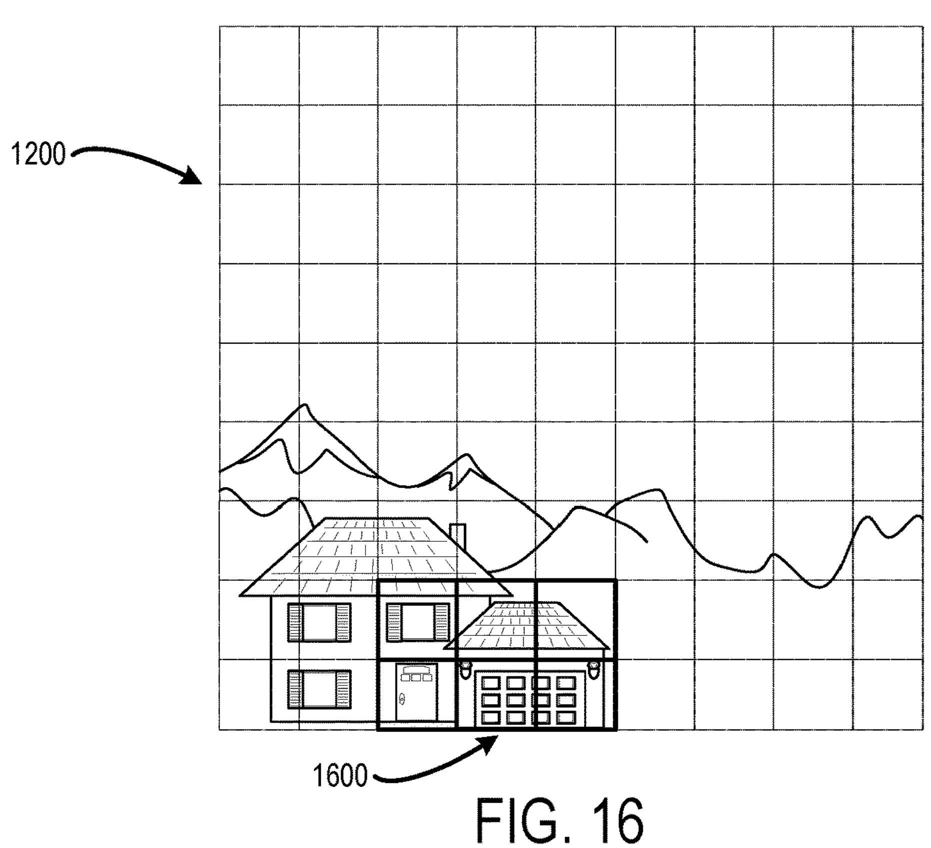

FIGS. 13 and 16 show an example scenario in which the target object-based neighboring sub-image identification process is performed using a bounding box based on the sub-image 1102. The sub-image 1102 is generated from sub-dividing the digital image 700 shown in FIG. 7. In FIG. 13, the 3D model generator logic 240 identifies a garage 1300 as the target object in the sub-image 1102 using the object identification algorithm 248. The 3D model generator logic 240 forms a bounding box 1302 around the garage 1300. Further, the 3D model generator logic 240 searches the plurality of sub-images 1200 for sub-images that include at least a portion of the area within the bounding box 1302 using object identification algorithm 248. The plurality of sub-images 1200 are generated from sub-dividing the digital image 900 shown in FIG. 9. In FIG. 16, the 3D model generator logic 240 identifies the subset of neighboring sub-images 1600 based at least on each neighboring sub-image in the subset 1600 including at least a portion of the area defined by the bounding box 1302.

In some implementations, the 3D model generator logic 240 may combine any of the different neighboring sub-image identification processes described herein to identify the subset of neighboring images 244.

The 3D model generator logic 240 is configured to generate a 3D model 226 of the target object 228 based at least on the plurality of sub images 224 and/or the subset of neighboring sub-images 244 using a photogrammetry algorithm 242. Since the sub-images are treated as distinct digital images having their own intrinsic and extrinsic parameters, the photogrammetry algorithm 242 does not have to consider any special considerations or have any customization in order to process the sub-images.

The 3D model generator logic 240 may be configured to generate the 3D model 226 using any suitable type of photogrammetry algorithm. In some examples, the 3D model generator logic 240 may be configured to generate the 3D model 226 using a photogrammetry algorithm in the form of a Multi-View Stereo (MVS) algorithm, such as Patch-Match Net, Patch-Match Stereo, Semi-global matching, DeepMVS, AANet, MVSNet, SurfaceNet, Point-MVSNet, Wide-baseline Stereo. In other examples, the 3D model generator logic 240 may be configured to generate the 3D model 226 using a photogrammetry algorithm in the form of a Structure-from-Motion (SfM) algorithm. In some examples, the 3D model generator logic 240 may apply the SfM algorithm prior to applying the MVS algorithm to generate the 3D model 226.

In some examples, the 3D model generator logic 240 is configured to generate the 3D model 226 based at least on plurality of sub-images 224. In some examples, the 3D model generator logic 240 is configured to generate the 3D model 226 based at least on the plurality of sub-images 224 and the subset of neighboring sub-images 244. Additionally or alternatively, in some examples, the computing system 200 may be configured to perform other downstream processing operations using any suitable algorithms and/or other computer logic that have been designed to process plural digital images.

Figure 19:
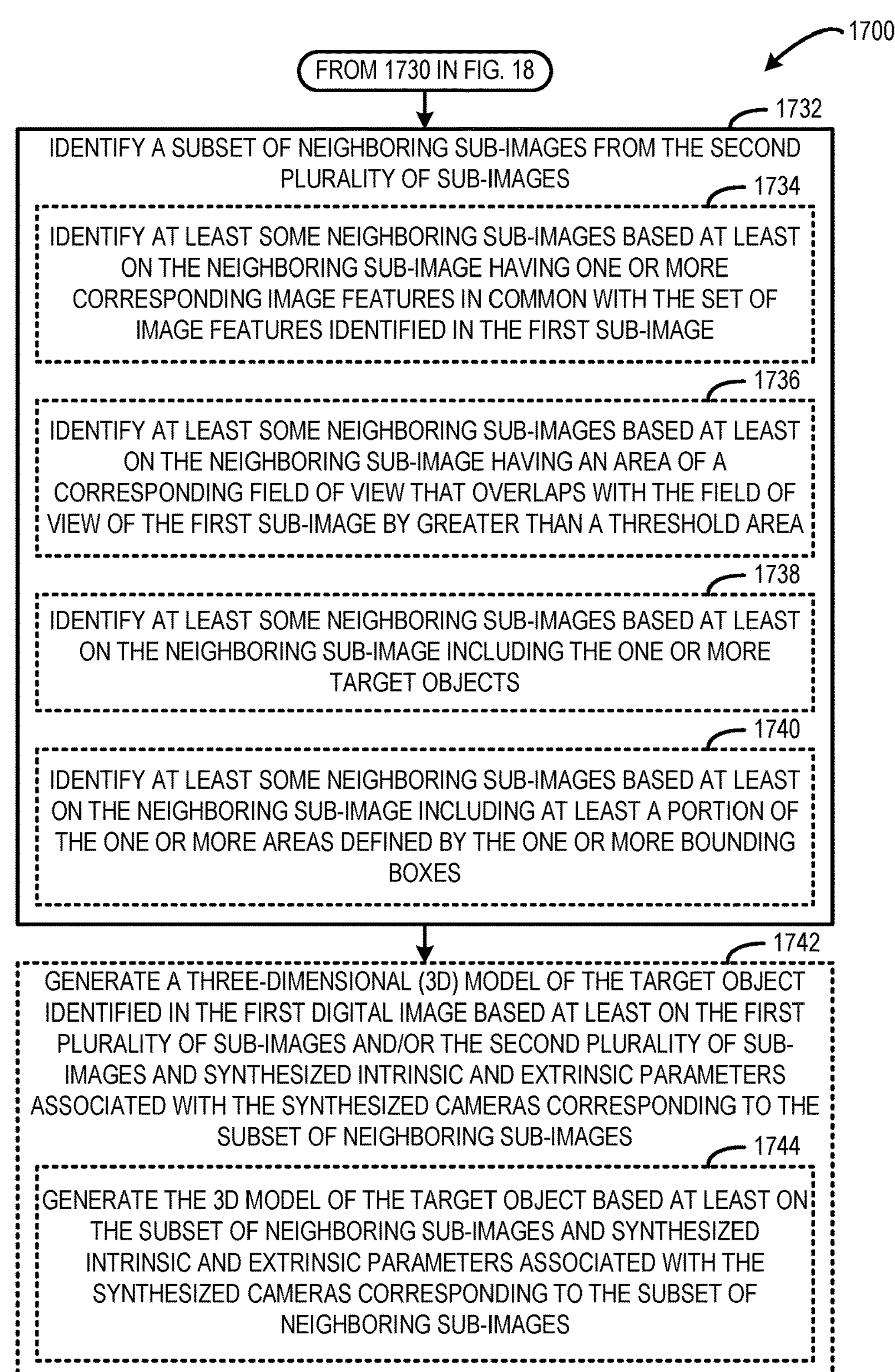

FIGS. 17-19 show an example digital image processing method 1700. For example, the method 1700 may be performed by the computing system 200 shown in FIG. 2 or any other suitable computing system.

In FIG. 17, at 1702, the method 1700 includes receiving a first digital image captured by a real camera having intrinsic and extrinsic parameters. The intrinsic parameters include a native principal point defined relative to an origin of a coordinate system of the first digital image.

In some implementations, at 1704, the method 1700 may include applying one or more distortion correction transformations to the first digital image to generate a distortion corrected digital image. In some examples, the distortion correction transformation(s) include at least one of a barrel distortion correction transformation, a pincushion distortion correction transformation, a radial distortion correction transformation, a tangential distortion correction transformation, a de-blurring transformation, a de-hazing transformation, or another suitable distortion correction transformation.

In some implementations, at 1706, the method 1700 may include identifying a target object in the first digital image. Any suitable object recognition or feature extraction algorithm(s) may be used to identify the target object.

In some implementations, at 1708, the method 1700 may include forming a bounding box around the target object in the first digital image.

At 1710, the method 1700 includes sub-dividing the first digital image into a first plurality of sub-images. In some implementations where the distortion-corrected image is generated, at 1712, the method 1700 may include sub-dividing the distortion-corrected image into a first plurality of distortion-corrected sub-images. Note that any downstream processing described as being performed on any of the plurality of sub-images is also performed on the plurality of distortion-corrected sub-images.

In some implementations, at 1714, the first digital image may be sub-divided into the first plurality of sub-images based at least on the target object identified in the first digital image. In some examples, the first plurality of sub-images may be sized and/or positioned such that the target object is contained within a minimum number of sub-images. In other examples, the digital image may be sub-divided in a different manner based at least on the target object.

In FIG. 18, at 1716, the method 1700 includes receiving a second digital image captured by a real camera having intrinsic and extrinsic parameters. The intrinsic parameters include a native principal point defined relative to an origin of a coordinate system of the second digital image. In some examples, the first and second digital images may be captured by the same real camera at different positions. In other examples, the first and second digital images may be captured by the same real camera at different times. In still other examples, the first and second digital images may be captured by different real cameras.

At 1718, the method 1700 includes sub-dividing the second digital image into a second plurality of sub-images. In some implementations, one or more distortion correction transformations may be applied to the second digital image prior t to sub-dividing the second digital image into the second plurality of sub-images.

At 1720, the method 1700 includes, for each sub-image of the first plurality of sub-images and the second plurality of sub-images, associating the sub-image with a synthesized recapture camera having synthesized intrinsic and extrinsic parameters mapped from the real camera. The synthesized intrinsic parameters include the native principal point defined relative to an origin of a coordinate system of the sub-image. In some examples, the native principal point defined relative to the origin of the coordinate system of the sub-image is outside the sub-image. In some examples, each sub-image of the plurality of sub-images maintains a same native spatial resolution as the digital image. In some examples, each sub-image of the plurality of sub-images has a same image size.

In some implementations, at 1722, the method 1700 may include identifying a set of image feature in a first sub-image of the first plurality of sub-images. Any suitable image feature identification algorithm(s) may be used to identify the set of image features.

In some implementations, at 1724, the method 1700 may include determining a field of view of the first sub-image. The field of view can be determined based on the synthesized intrinsic and extrinsic parameters of the first sub-image.

In some implementations, at 1726, the method 1700 may include identifying one or more target objects in the first sub-image. Any suitable object identification algorithm(s) may be used to identify the target object.

In some implementations, at 1728, the method 1700 may include forming one or more bounding boxes defining one or more areas around the one or more target object in the first sub-image.

In some implementations, at 1730, the method 1700 may include, for each sub-image of the second plurality of sub-images, determining a field of view of the sub-image. The field of view can be determined based on the synthesized intrinsic and extrinsic parameters of the sub-image.

In FIG. 19, at 1732, the method 1700 includes identifying a subset of neighboring sub-images from the second plurality of sub-images. In some implementations where the set of image features identified in the first sub-image, at 1734, the method 1700 may include identifying at least some neighboring sub-images based at least on the neighboring sub-image having one or more corresponding image features in common with the set of image features identified in the first sub-image. In some implementations where the field of view is determined in the first sub-image, at 1736, the method 1700 may include identify at least some neighboring sub-images based at least on the neighboring sub-image having an area of a corresponding field of view that overlaps with the field of view of the first sub-image by greater than a threshold area. In some implementations where one or more target objects are identified in the first sub-image, at 1738, the method 1700 may include identifying at least some neighboring sub-images based at least on the neighboring sub-image including the one or more target objects. In some implementations where one or more bounding boxes are formed around the one or more target objects, at 1740, the method 1700 may include identifying at least some neighboring sub-images based at least on the neighboring sub-image including at least a portion of the one or more areas defined by the one or more bounding boxes. Depending on the implementation, any of the above-described neighboring sub-image identification processes may be performed alone or in combination.

In some implementations, at 1742, the method 1700 may include generating a three-dimensional (3D) model of the target object identified in the first digital image based at least on the first plurality of sub-images and/or the second plurality of sub-images and synthesized intrinsic and extrinsic parameters associated with the synthesized cameras corresponding to the first plurality of sub-images and the second plurality of sub-images. The 3D model may be generated using any suitable photogrammetry algorithm including a MVS algorithm and/or a SfM algorithm.

In some implementations, at 1744, the method 1700 may include generating the 3D model of the target object based at least on the subset of neighboring sub-images and synthesized intrinsic and extrinsic parameters associated with the synthesized cameras corresponding to the subset of neighboring sub-images. In such implementations, other non-relevant sub-images that are excluded from the subset of neighboring images may not be processed to generate the 3D model of the target object.

Additionally or alternatively, in some implementations, the method 1700 may include performing other downstream processing operations using any suitable algorithms and/or other computer logic that have been designed to process plural digital images.

The digital image processing method sub-divides a digital image into a plurality of sub-images having much smaller sizes while maintaining the same spatial resolution. Further, each sub-image has their own intrinsic and extrinsic parameters, which are accurately synthesized by redefining the native principal point of the digital image relative to the origin of the coordinate system of the sub-image. This allows for each sub-image to be processed separately for downstream processing operations (e.g., 3D modeling) in a memory efficient manner. In other words, the digital image processing method provides the technical benefit of increasing computer processing performance, because the intelligently selected sub-images can be collectively analyzed/processed faster relative to analyzing the corresponding native digital image from which the sub-images were sub-divided.

Furthermore, the digital image processing method may apply one or more distortion correction transformations to a digital image prior to being sub-divided to account for various distortions in the native digital image (e.g., distortions from a lens of a real camera that captured the native digital image). The distortion-corrected image is sub-divided into a plurality of sub-images, such that the same distortion correction(s) are carried through to the sub-images when they are generated. The distortion-corrected sub-images provide more accurate representations of an imaged scene/a target object to be 3D modeled than sub-images that are not distortion corrected.

Furthermore, the digital image processing method identifies a subset of neighboring sub-images for a given sub-image based at least on those neighboring sub-images having various commonalities or shared traits with the given sub-image. These intelligently selected neighboring sub-images can be collectively analyzed/processed faster relative to indiscriminately processing all sub-images generated from sub-dividing a digital image. Additionally, the digital image processing method provides the technical benefit of increasing computer processing performance, because the intelligently selected neighboring sub-images can provide a more accurate representation of a target object being modeled by the 3D model generator logic than a collection of digital images (or sub-images) that are not necessarily relevant.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 20:
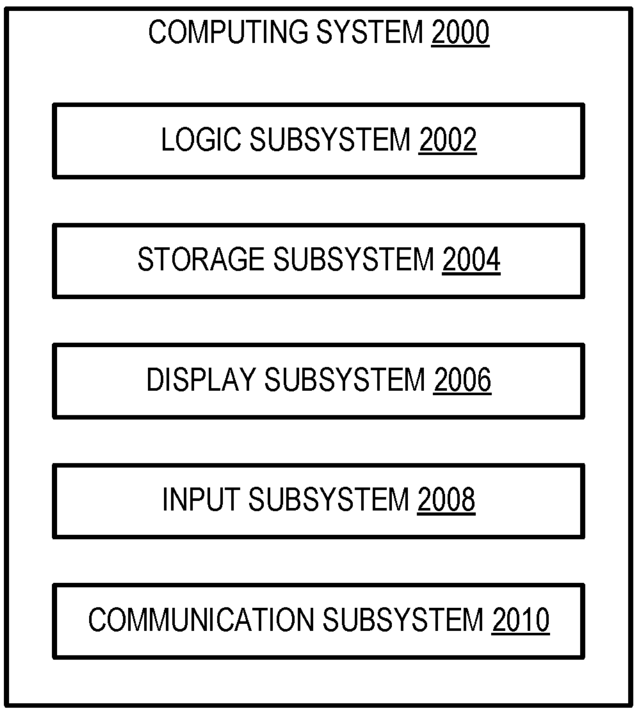
FIG. 20 shows an example computing system.

FIG. 20 schematically shows a simplified representation of a computing system 2000 configured to provide any to all of the compute functionality described herein. Computing system 2000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 2000 includes a logic subsystem 2002 and a storage subsystem 2004. Computing system 2000 may optionally include a display subsystem 2006, input subsystem 2008, communication subsystem 2010, and/or other subsystems not shown in FIG. 20.

Logic subsystem 2002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 2004 includes one or more physical devices configured to temporarily and/or permanently hold computer information such as data and instructions executable by the logic subsystem. When the storage subsystem includes two or more devices, the devices may be collocated and/or remotely located. Storage subsystem 2004 may include volatile, nonvolatile, dynamic, static, read/write, read-only, random-access, sequential-access, location-addressable, file-addressable, and/or content-addressable devices. Storage subsystem 2004 may include removable and/or built-in devices. When the logic subsystem executes instructions, the state of storage subsystem 2004 may be transformed—e.g., to hold different data.

Aspects of logic subsystem 2002 and storage subsystem 2004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines/logic may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve the functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 2006 may be used to present a visual representation of data held by storage subsystem 2004. This visual representation may take the form of a graphical user interface (GUI). Display subsystem 2006 may include one or more display devices utilizing virtually any type of technology. In some implementations, display subsystem may include one or more virtual-, augmented-, or mixed reality displays.

When included, input subsystem 2008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 2010 may be configured to communicatively couple computing system 2000 with one or more other computing devices. Communication subsystem 2010 may include wired and/or wireless communication devices compatible with one or more different communication protocols. The communication subsystem may be configured for communication via personal-, local- and/or wide-area networks.

In an example, a digital image processing method performed by a computer comprises receiving a first digital image captured by a real camera having a first set of intrinsic parameters and extrinsic parameters, sub-dividing the first digital image into a first plurality of sub-images, each sub-image of the first plurality of sub-images having a corresponding set of synthesized intrinsic parameters and extrinsic parameters that are mapped from the first set of intrinsic parameters and extrinsic parameters of the real camera that captured the first digital image, receiving a second digital image captured by a real camera having a second set of intrinsic and/or extrinsic parameters, sub-dividing the second digital image into a second plurality of sub-images, each sub-image of the second plurality of sub-images having a corresponding set of synthesized intrinsic parameters and extrinsic parameters that are mapped from the second set of intrinsic parameters and extrinsic parameters of the real camera that captured the second digital image, identifying a set of image features in a first sub-image of the first plurality of sub-images, and identifying a subset of neighboring sub-images from the second plurality of sub-images based at least on each neighboring sub-image of the subset of neighboring sub-images having one or more corresponding image features in common with the set of image features identified in the first sub-image. In this example and/or other examples, the subset of neighboring sub-images may be identified based at least on each neighboring sub-image of the subset of neighboring sub-images having more than a threshold number of image features in common with the set of image features identified in the first sub-image. In this example and/or other examples, the method may further comprise determining a field of view of the first sub-image based at least on the synthesized intrinsic parameters and extrinsic parameters of the first sub-image, for each sub-image of the second plurality of sub-images, determining a field of view of the sub-image based at least on the synthesized intrinsic parameters and extrinsic parameters of the sub-image, and at least some neighboring sub-images in the subset of neighboring sub-images may be identified from the second plurality of sub-images based at least on having an area of a corresponding field of view that overlaps with the field of view of the first sub-image by greater than a threshold area. In this example and/or other examples, the method may further comprise identifying one or more target objects in the first sub-image, and at least some neighboring sub-images in the subset of neighboring sub-images may be identified from the second plurality of sub-images based at least on including the one or more target objects. In this example and/or other examples, the method may further comprise forming one or more bounding boxes defining one or more areas around the one or more target objects, and at least some neighboring sub-images in the subset of neighboring sub-images may be identified from the second plurality of sub-images based at least on including at least a portion of the one or more areas defined by the one or more bounding boxes. In this example and/or other examples, an image size of each sub-image of the second plurality of sub-images may be smaller than an image size of the first sub-image. In this example and/or other examples, the method of claim may further comprise identifying a target object in the first digital image, and generating a three-dimensional (3D) model of the target object based at least on the subset of neighboring sub-images and synthesized intrinsic and extrinsic parameters corresponding to the subset of neighboring sub-images. In this example and/or other examples, the intrinsic parameters of the first digital image may include a first native principal point defined relative to a first origin of a coordinate system of the first digital image, and the synthesized intrinsic parameters of the first sub-image may include the first native principal point defined relative to an origin of a coordinate system of the first sub-image.

In another example, a digital image processing method performed by a computer comprises receiving a first digital image captured by a real camera having a first set of intrinsic and extrinsic parameters, sub-dividing the first digital image into a first plurality of sub-images, each sub-image of the first plurality of sub-images having a corresponding set of synthesized intrinsic parameters and extrinsic parameters that are mapped from the first set of intrinsic parameters and the extrinsic parameters of the real camera that captured the first digital image, receiving a second digital image captured by a real camera having a second set of intrinsic and extrinsic parameters, sub-dividing the second digital image into a second plurality of sub-images, each sub-image of the second plurality of sub-images having a corresponding set of synthesized intrinsic parameters and extrinsic parameters that are mapped from the second set of intrinsic parameters and the extrinsic parameters of the real camera that captured the second digital image, determining a field of view of a first sub-image of the first plurality of sub-images based at least on the synthesized intrinsic parameters and extrinsic parameters of the first sub-image, for each sub-image of the second plurality of sub-images, determining a field of view of the sub-image based at least on the synthesized intrinsic parameters and extrinsic parameters of the sub-image, and identifying a subset of neighboring sub-images from the second plurality of sub-images based at least on each neighboring sub-image of the subset of neighboring sub-images having an area of a corresponding field of view that overlaps with the field of view of the first sub-image by greater than a threshold area. In this example and/or other examples, the threshold area may be greater than 25% of the field of view. In this example and/or other examples, the method may further comprise identifying a set of image features in the first sub-image, and at least some neighboring sub-images in the subset of neighboring sub-images may be identified from the second plurality of sub-images based at least on having one or more corresponding image features in common with the set of image features identified in the first sub-image. In this example and/or other examples, the method may further comprise identifying one or more target objects in the first sub-image, and at least some neighboring sub-images in the subset of neighboring sub-images may be identified from the second plurality of sub-images based at least on including the one or more target objects. In this example and/or other examples, the method may further comprise forming one or more bounding boxes defining one or more areas around the one or more target objects, and at least some neighboring sub-images in the subset of neighboring sub-images may be identified from the second plurality of sub-images based at least on including at least a portion of the one or more areas defined by the one or more bounding boxes. In this example and/or other examples, an image size of each sub-image of the second plurality of sub-images may be smaller than an image size of the first sub-image. In this example and/or other examples, the method may further comprise identifying a target object in the first digital image, and generating a three-dimensional (3D) model of the target object based at least on the subset of neighboring sub-images and synthesized intrinsic and extrinsic parameters corresponding to the subset of neighboring sub-images. In this example and/or other examples, the intrinsic parameters of the first digital image may include a first native principal point defined relative to a first origin of a coordinate system of the first digital image, and the synthesized intrinsic parameters of the first sub-image may include the first native principal point defined relative to an origin of a coordinate system of the first sub-image.

In yet another example, a digital image processing method performed by a computer comprises receiving a first digital image captured by a real camera having a first set of intrinsic and extrinsic parameters, sub-dividing the first digital image into a first plurality of sub-images, each sub-image of the first plurality of sub-images having a corresponding set of synthesized intrinsic parameters and extrinsic parameters that are mapped from the first set of intrinsic parameters and the extrinsic parameters of the real camera that captured the first digital image, receiving a second digital image captured by a real camera having a second set of intrinsic and extrinsic parameters, sub-dividing the second digital image into a second plurality of sub-images, each sub-image of the second plurality of sub-images having a corresponding set of synthesized intrinsic parameters and extrinsic parameters that are mapped from the second set of intrinsic parameters and the extrinsic parameters of the real camera that captured the second digital image, identifying one or more target objects in a first sub-image of the first plurality of images, and identifying a subset of neighboring sub-images from the second plurality of sub-images based at least on each neighboring sub-image of the subset of neighboring sub-images also including the one or more target objects. In this example and/or other examples, the method may further comprise forming one or more bounding boxes defining one or more areas around the one or more target objects in the first sub-image, and at least some neighboring sub-images in the subset of neighboring sub-images may be identified from the second plurality of sub-images based at least on including at least a portion of the one or more areas defined by the one or more bounding boxes. In this example and/or other examples, an image size of each sub-image of the second plurality of sub-images may be smaller than an image size of the first sub-image. In this example and/or other examples, the method may further comprises identifying a target object in the first digital image, and generating a three-dimensional (3D) model of the target object based at least on the subset of neighboring sub-images and synthesized intrinsic and extrinsic parameters corresponding to the subset of neighboring sub-images.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A digital image processing method performed by a computer, the method comprising:

receiving a first digital image captured by a real camera having a first set of intrinsic parameters and extrinsic parameters;

sub-dividing the first digital image into a first plurality of sub-images, each sub-image of the first plurality of sub-images having a corresponding set of synthesized intrinsic parameters and extrinsic parameters that are mapped from the first set of intrinsic parameters and extrinsic parameters of the real camera that captured the first digital image;

receiving a second digital image captured by a real camera having a second set of intrinsic and extrinsic parameters;

sub-dividing the second digital image into a second plurality of sub-images, each sub-image of the second plurality of sub-images having a corresponding set of synthesized intrinsic parameters and extrinsic parameters that are mapped from the second set of intrinsic parameters and extrinsic parameters of the real camera that captured the second digital image;

identifying a set of image features in a first sub-image of the first plurality of sub-images; and identifying a subset of neighboring sub-images from the second plurality of sub-images based at least on each neighboring sub-image of the subset of neighboring sub-images having one or more corresponding image features in common with the set of image features identified in the first sub-image.

2. The method of claim 1, wherein the subset of neighboring sub-images are identified based at least on each neighboring sub-image of the subset of neighboring sub-images having more than a threshold number of image features in common with the set of image features identified in the first sub-image.

3. The method of claim 1, further comprising:

determining a field of view of the first sub-image based at least on the synthesized intrinsic parameters and extrinsic parameters of the first sub-image;

for each sub-image of the second plurality of sub-images, determining a field of view of the sub-image based at least on the synthesized intrinsic parameters and extrinsic parameters of the sub-image; and wherein at least some neighboring sub-images in the subset of neighboring sub-images are identified from the second plurality of sub-images based at least on having an area of a corresponding field of view that overlaps with the field of view of the first sub-image by greater than a threshold area.

4. The method of claim 1, further comprising:

identifying one or more target objects in the first sub-image; and wherein at least some neighboring sub-images in the subset of neighboring sub-images are identified from the second plurality of sub-images based at least on including the one or more target objects.

5. The method of claim 4, further comprising:

forming one or more bounding boxes defining one or more areas around the one or more target objects; and wherein at least some neighboring sub-images in the subset of neighboring sub-images are identified from the second plurality of sub-images based at least on including at least a portion of the one or more areas defined by the one or more bounding boxes.

6. The method of claim 1, wherein an image size of each sub-image of the second plurality of sub-images is smaller than an image size of the first sub-image.

7. The method of claim 1, further comprising:

identifying a target object in the first digital image; and generating a three-dimensional (3D) model of the target object based at least on the subset of neighboring sub-images and synthesized intrinsic and extrinsic parameters corresponding to the subset of neighboring sub-images.

8. The method of claim 1, wherein the intrinsic parameters of the first digital image include a first native principal point defined relative to a first origin of a coordinate system of the first digital image, and wherein the synthesized intrinsic parameters of the first sub-image include the first native principal point defined relative to an origin of a coordinate system of the first sub-image.

9. A digital image processing method performed by a computer, the method comprising:

receiving a first digital image captured by a real camera having a first set of intrinsic and extrinsic parameters;

sub-dividing the first digital image into a first plurality of sub-images, each sub-image of the first plurality of sub-images having a corresponding set of synthesized intrinsic parameters and extrinsic parameters that are mapped from the first set of intrinsic parameters and the extrinsic parameters of the real camera that captured the first digital image;

receiving a second digital image captured by a real camera having a second set of intrinsic and extrinsic parameters;

sub-dividing the second digital image into a second plurality of sub-images, each sub-image of the second plurality of sub-images having a corresponding set of synthesized intrinsic parameters and extrinsic parameters that are mapped from the second set of intrinsic parameters and the extrinsic parameters of the real camera that captured the second digital image;

determining a field of view of a first sub-image of the first plurality of sub-images based at least on the synthesized intrinsic parameters and extrinsic parameters of the first sub-image;

for each sub-image of the second plurality of sub-images, determining a field of view of the sub-image based at least on the synthesized intrinsic parameters and extrinsic parameters of the sub-image; and identifying a subset of neighboring sub-images from the second plurality of sub-images based at least on each neighboring sub-image of the subset of neighboring sub-images having an area of a corresponding field of view that overlaps with the field of view of the first sub-image by greater than a threshold area.

10. The method of claim 9, wherein the threshold area is greater than 25% of the field of view.

11. The method of claim 9, further comprising:

identifying a set of image features in the first sub-image; and wherein at least some neighboring sub-images in the subset of neighboring sub-images are identified from the second plurality of sub-images based at least on having one or more corresponding image features in common with the set of image features identified in the first sub-image.

12. The method of claim 9, further comprising:

identifying one or more target objects in the first sub-image; and wherein at least some neighboring sub-images in the subset of neighboring sub-images are identified from the second plurality of sub-images based at least on including the one or more target objects.

13. The method of claim 12, further comprising:

forming one or more bounding boxes defining one or more areas around the one or more target objects; and wherein at least some neighboring sub-images in the subset of neighboring sub-images are identified from the second plurality of sub-images based at least on including at least a portion of the one or more areas defined by the one or more bounding boxes.

14. The method of claim 9, wherein an image size of each sub-image of the second plurality of sub-images is smaller than an image size of the first sub-image.

15. The method of claim 9, further comprising:

identifying a target object in the first digital image; and generating a three-dimensional (3D) model of the target object based at least on the subset of neighboring sub-images and synthesized intrinsic and extrinsic parameters corresponding to the subset of neighboring sub-images.

16. The method of claim 9, wherein the intrinsic parameters of the first digital image include a first native principal point defined relative to a first origin of a coordinate system of the first digital image, and wherein the synthesized intrinsic parameters of the first sub-image include the first native principal point defined relative to an origin of a coordinate system of the first sub-image.

17. A digital image processing method performed by a computer, the method comprising:

receiving a first digital image captured by a real camera having a first set of intrinsic and extrinsic parameters;

sub-dividing the first digital image into a first plurality of sub-images, each sub-image of the first plurality of sub-images having a corresponding set of synthesized intrinsic parameters and extrinsic parameters that are mapped from the first set of intrinsic parameters and the extrinsic parameters of the real camera that captured the first digital image;

receiving a second digital image captured by a real camera having a second set of intrinsic and extrinsic parameters;

sub-dividing the second digital image into a second plurality of sub-images, each sub-image of the second plurality of sub-images having a corresponding set of synthesized intrinsic parameters and extrinsic parameters that are mapped from the second set of intrinsic parameters and the extrinsic parameters of the real camera that captured the second digital image;

identifying one or more target objects in a first sub-image of the first plurality of images; and identifying a subset of neighboring sub-images from the second plurality of sub-images based at least on each neighboring sub-image of the subset of neighboring sub-images also including the one or more target objects.

18. The method of claim 17, further comprising:

forming one or more bounding boxes defining one or more areas around the one or more target objects in the first sub-image; and wherein at least some neighboring sub-images in the subset of neighboring sub-images are identified from the second plurality of sub-images based at least on including at least a portion of the one or more areas defined by the one or more bounding boxes.

19. The method of claim 17, wherein an image size of each sub-image of the second plurality of sub-images is smaller than an image size of the first sub-image.

20. The method of claim 17, further comprising:

identifying a target object in the first digital image; and generating a three-dimensional (3D) model of the target object based at least on the subset of neighboring sub-images and synthesized intrinsic and extrinsic parameters corresponding to the subset of neighboring sub-images.

* * * * *